US00RE42847E

(19) United States
(12) Reissued Patent
Politis

(10) Patent Number: US RE42,847 E
(45) Date of Reissued Patent: Oct. 18, 2011

(54) EXPRESSION TREE OPTIMIZATION FOR PROCESSING OBSCURED GRAPHICAL OBJECTS

(75) Inventor: George Politis, Ryde (AU)

(73) Assignee: Canon Kabushiki Kaisha, Tokyo (JP)

(21) Appl. No.: 10/368,583

(22) Filed: Feb. 20, 2003

Related U.S. Patent Documents

Reissue of:

(64) Patent No.: 6,191,797
Issued: Feb. 20, 2001
Appl. No.: 08/861,063
PCT Filed: May 21, 1997

(30) Foreign Application Priority Data

May 22, 1996 (AU) ..... PO0021

(51) Int. Cl.
*G06T 15/00* (2006.01)

(52) U.S. Cl. ..... 345/440; 345/422; 345/420; 345/421

(58) Field of Classification Search ..... 345/420–421, 345/433, 435, 440, 419, 422
See application file for complete search history.

(56) References Cited

U.S. PATENT DOCUMENTS

| | | | | |
|---|---|---|---|---|
| 5,123,084 A | | 6/1992 | Prevost et al. | 345/420 |
| 5,274,718 A | | 12/1993 | Leonardi et al. | 382/240 |
| 5,295,236 A | | 3/1994 | Bjorge et al. | 395/134 |
| 5,515,487 A | * | 5/1996 | Beaudet et al. | 345/440 |
| 5,579,455 A | | 11/1996 | Greene et al. | 345/422 |
| 5,600,763 A | | 2/1997 | Greene et al. | 345/420 |

(Continued)

FOREIGN PATENT DOCUMENTS

AU 23362/95 * 2/1996

(Continued)

OTHER PUBLICATIONS

Goldfeather, Jack; Near Real-Time CSG Rendering Using Tree Normalization and Geometric Pruning; IEEE Computer Graphics & Applications; pp. 20-28.

(Continued)

*Primary Examiner* — Phu K Nguyen
(74) *Attorney, Agent, or Firm* — Fitzpatrick, Cella, Harper & Scinto

(57) ABSTRACT

The present invention relates to a method, apparatus and system for optimizing an expression tree (101,902,1102) for compositing an image. Such an expression tree (101,902, 1102) can comprise at least two nodes. Each node is either a graphical element (102,104) or image compositing operator ((103,104) and has a region of the image represented by the node (102,103,104). In the method, for at least one node in the tree, several steps are carried out. The region represented by the node (103,104) is compared to a region representation data structure, which is preferably a quadtree representation, corresponding to one or more regions represented by at least one other node. A determination is then made if the region represented by the node (102,103,104) is totally or partially obscured by the one or more regions. If the region represented by the node is at least partially or totally obscured, the expression tree (101,902,1102) is modified. Modifying the expression tree (101,902,1102) involves applying a clipping operator (58,59) to the node if the region represented by the node is partially obscured. If the node is totally obscured, either removing the node if the node is a graphical element (102, 104) or applying a predetermined set of node replacement rules in accordance with the image compositing operator if the node (103) is a image compositing operator.

32 Claims, 10 Drawing Sheets

U.S. PATENT DOCUMENTS

| | | | | |
|---|---|---|---|---|
| 5,724,494 | A | 3/1998 | Politis | 345/434 |
| 5,745,121 | A | 4/1998 | Politis | 345/433 |
| 2002/0027563 | A1* | 3/2002 | Van Doan et al. | 345/630 |
| 2003/0118250 | A1* | 6/2003 | Tlaskal et al. | 382/284 |
| 2005/0267908 | A1* | 12/2005 | LeTourneau | 707/101 |

FOREIGN PATENT DOCUMENTS

| | | | |
|---|---|---|---|
| AU | A-23362/95 | | 2/1996 |
| EP | 0528631 | | 2/1993 |
| EP | 069881 | | 1/1996 |
| EP | 0694881 | * | 1/1996 |
| JP | 8-115413 | | 5/1996 |

OTHER PUBLICATIONS

M. Shantzis, "A Model for Efficient and Flexible Image Computer", pp. 147-154, Computer Graphics SIGGRAPH 1991, Jul. 28-Aug. 2, Las Vegas, Jan. 1, 1994 XP000571017.

* cited by examiner

EXPRESSION TREE OPTIMIZATION FOR PROCESSING OBSCURED GRAPHICAL OBJECTS

Matter enclosed in heavy brackets [ ] appears in the original patent but forms no part of this reissue specification; matter printed in italics indicates the additions made by reissue.

*This application is a reissue of U.S. Pat. No. 6,191,797, which issued from application Ser. No. 08/861,063 filed May 21, 1997.*

FIELD OF THE INVENTION

The present invention relates to the creation of computer-generated images both in the form of still pictures and video imagery, and, in particular, relates to a process, apparatus, and system for creating an image made up by compositing multiple components.

BACKGROUND

Computer generated images are typically made up of many differing components or graphical elements which are rendered and composited together to create a final image. In recent times, an "opacity channel" (also known as a "matte", an "alpha channel", or simply "opacity") has been commonly used. The opacity channel contains information regarding the transparent nature of each element. The opacity channel is stored alongside each instance of a colour, so that, for example, a pixel-based image with opacity stores an opacity value as part of the representation of each pixel. An element without explicit opacity channel information is typically understood to be fully opaque within some defined bounds of the element, and assumed to be completely transparent outside those bounds.

An expression tree offers a systematic means of representation for rendering objects or elements of an image. Expression trees comprise a plurality of nodes including leaf nodes, internal nodes and a root node. A leaf node, being the outer most node of an expression tree, has no descendent nodes and consists of one or more graphical elements. An internal node typically branches to left and right subtrees, wherein each subtree is itself an expression tree comprising at least one leaf node. The internal nodes of an expression tree are compositing operators, which treat the left and right subtrees as operands of the operator. The first node of the expression tree is commonly referred to as a root node. The root node of an expression tree represents the final image, and each node of the tree represents a portion of the final image.

Although a graphical element may of itself be of a certain size, it need not be entirely visible in a final image, or only a portion of the element may have an effect on the final image. For example, assume an image of a certain size is to be displayed on a display. However, if the image is positioned so that only the top left corner of the image is displayed by the display device, the remainder of the image is not displayed. The final image as displayed on the display device thus comprises the visible portion of the image, and the invisible portion in such a case need not be rendered.

Another way in which only a portion of an element may have an effect is when the portion is obscured by another element. For example, a final image to be displayed (or rendered) may comprise one or more opaque graphical elements, sonic of which obscure other graphical elements. Hence, the obscured elements have no effect on the final image.

If an element, or parts of elements, that have no effect on true final image can be identified, those elements (or parts) need not be rendered, thereby saving considerable time and possibly memory.

Problems arise with prior art methods, at least for images where overlaps occur, because these methods do not easily cope with transparent graphical objects, nor do they handle the full range of compositing operators. It is therefore desirable to at least ameliorate one or more of those problems.

SUMMARY

In accordance with one aspect of the present invention, there is provided a method of optimising an expression tree for compositing an image, the expression tree comprising graphical elements and graphical operators, each node in the tree being either a graphical element or a graphical operator and having a region of the image represented by the node, the method comprising, for at least one node in the tree:

comparing the region represented by the node to a region representation data structure corresponding to one or more regions represented by at least one other node;

determining if the region represented by the node is totally or partially obscured by the one or more regions; and modifying the expression tree in the event that the region represented by the node is partially or totally obscured.

In accordance with another aspect of the present invention, there is provided a method of optimising an expression tree for compositing an image, the expression tree comprising a node being either a graphical element or a graphical operator and having a region of the image represented by the node, the method comprising the steps of:

traversing the expression tree node by node;

determining at a current node if a region of the image represented at the node is obscured by regions represented by at least one other node, and modifying the expression tree in the event that the current node is partially or totally obscured.

In accordance with yet another aspect of the present invention there is provided a method of optimising an expression tree for compositing an image, the expression tree comprising a node being either a graphical element or a graphical operator and having a region of the image represented by the node, the method comprising the steps of:

traversing the expression tree node by node and at each current node comprising a graphical operator applying the sub-steps of:

(i) receiving a first region representation from a parent node;

(ii) passing to a first operand of the graphical operator a modified first region representation in accordance with a first predetermined modification rule for the operator;

(iii) returning to the graphical operator a second region representation of regions obscured by a sub-tree associated with the first operand;

(iv) passing to a second operant of the graphical operator a modified second region representation in accordance with a second predetermined modification rule for the operator;

(v) returning to the graphical operator a third region representation of regions obscured by a sub-tree associated with the second operand; and (vi) determining, in accordance with a set rule for the graphical operator, a final region representation to be returned to the parent node.

BRIEF DESCRIPTION OF THE DRAWINGS

A preferred embodiment of the present invention is hereinafter described with reference to the accompanying drawings and the Appendix, in which.

Figure 1:
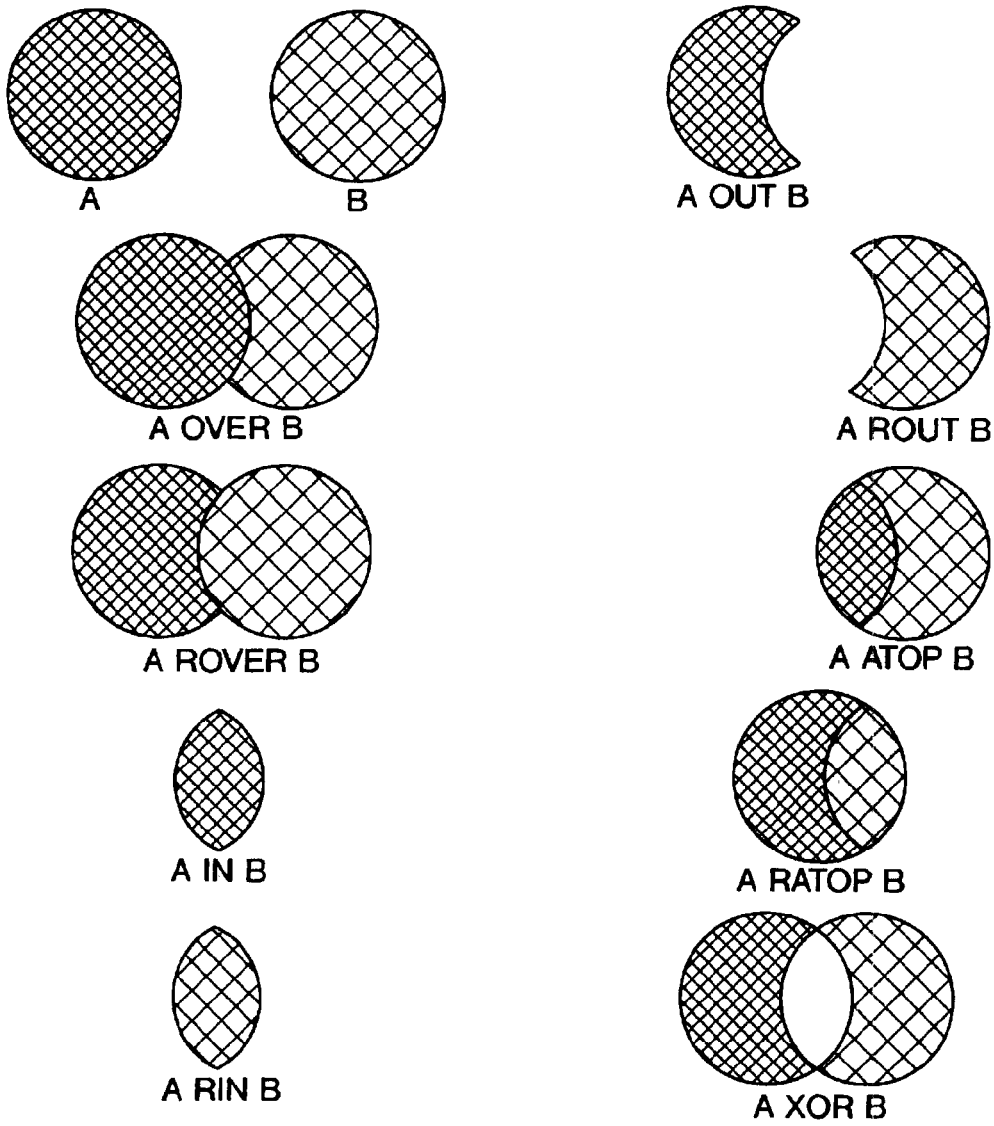
FIG. 1 schematically illustrates various compositing operations.

The Appendix contains pseudo-code routines suitable for computer implementation of the preferred embodiment.

DETAILED DESCRIPTION

In the following description of the preferred embodiment, it is assumed that an image composition expression tree, as herein described, has been determined for an image to be rendered.

Preferably, image region representations are hierarchical data structures suitable for representing a region or portion of an image and typically used in image processing. One such image region representation is known to those skilled in the art as "quadtrees". Other forms of image region representations can serve the same purpose. For the sake of simplicity, an image region representation is hereinafter referred to as a quadtree.

Typically, the creation of a quadtree representing a region of an image requires the sub-division of the region into a plurality of cells, each cell being a portion of the region, and each cell represented by a node of the quadtree. Hence, increasing the number of subdivisions of a region of an image correspondingly increases the number of nodes of the quadtree, thereby increasing the depth of the quadtree and the resolution of the region represented by the quadtree.

Compositing Operations

Compositing operations include 13 main compositing operations; for combining two portions of a single image. The function of each of those compositing operations is set our in Table 1, where Dc is a premultiplied destination or resultant color, Do is a destination or resultant alpha ($\alpha$) channel value, Ac is a premultiplied pixel color of a first portion of a first source A, Ao is an a value corresponding to the pixel having the color Ac, Bc is a premultiplied pixel color value of a portion of an image of a second source B, and Bo is the $\alpha$ channel value of the pixel corresponding to Bc of the source B.

TABLE 1

Compositing Operations

| OPERATION | EQUATION |
|---|---|
| clear | Dc = 0 |
| | Do = 0 |
| A | Dc = Ac |
| | Do = Ao |
| B | Dc = Bc |
| | Do = Bo |
| A over B | Dc = Ac + Bc (1 − Ao) |
| | Do = Ao + Bo (1 − Ao) |
| A rover B | Dc = Ac (1 − Bo) + Bc (Reverse case of A over B) |
| | Do = Ao (1 − Bo) + Bo |
| A in B | Dc = AcBo |
| | Do = AoBo |
| A rin B | Dc = AoBc (Reverse case of A in B) |
| | Do = AoBc |
| A out B | Dc = Ac (1 − Bo) |
| | Do = Ao (1 − Bo) |
| A rout B | Dc = Bc (1 − Ao) (Reverse case of A out B) |
| | Do = Bo (1 − Ao) |
| A atop B | Dc = AcBo + Bc (1 − Ao) |
| | Do = AoBo + Bo (1 − Ao) |
| A ratop B | Dc = Ac (1 − Bo) + BcAo |
| | Do = Ao (1 − Bo) + BoAo |
| A Xor B | Dc = Ac (1 − Bo) + Bc (1 − Ao) |
| | Do = Ao (1 − Bo) + Bo (1 − Ao) |
| A plusW B | Dc = Ac + Bc (with Dc "wrap around") |
| | Do = Ao + Bo (with Do "wrap around") |
| A plusC B | Dc = Ac + Bc (with Dc "clamped") |
| | Do = Ao + Bo (with Do "clamped") |

Table 1 specifically shows various compositing methods for combining two different images together utilising different operators. Additional operators are also possible. The additional operators may be utilized to implement special effects.

The "wrap around" nature of the "plusW" operator means that when, for example, the addition of Ac+Bc is greater than a maximum value of a color component, the value is "wrapped around" to start again with reference to the minimum value in the color space. Alternatively, the process of "clamping" utilized by "plusC" involves clamping the addition of, for example, Ac+Bc to the maximum value of a color component when the addition is greater than this component.

FIG. 1 illustrates several examples of the final image created when various operations (as set out in Table 1) are utilized in the compositing of two fully opaque circles A and B. The operators "rover", "rin", "rout" and "ratop" are equivalent to the swapping of the operands to the "r" (reverse) operator and applying the corresponding operator "over", "in", "out" and "atop" respectively.

In the preferred embodiment, an expression tree can contain a variety of node types including binary compositing operators, unary operators and primitives. Unary operators typically include colour transformations, image convolutions, affine transformations and image warping. Primitives typically include graphical elements like pixel-based images, spline-based paths, text, "all" ("all" is a graphical element which spans the size of the entire image being created), edge blends, boxes or the like.

Binary Compositing Operators

Table 2 lists a set of binary compositing operators and the action to be performed when those operators are treated when simplifying an expression tree.

TABLE 2

| Operator | Pass to left operand | Pass to right operand | Return | If left operand vanishes | If right operand vanishes |
|---|---|---|---|---|---|
| over | $q_0$ | $q_0 \cup q_L$ | $q_L \cup q_R$ | R | L |
| in | $q_0$ | $q_0$ | $q_L \cap q_R$ | V | V |
| ratop | $q_0$ | $q_0$ | $q_L$ | V | L |
| out (apply to right operand first) | $q_0 \cup q_R$ | $q_0$ | $q_L - B(right)$ | V | L |
| out (apply to left operand first) | $q_0$ | $q_0$ | $q_L - B(right)$ | V | L |
| plusC | $q_0$ | $q_0$ | $q_L \cup q_R$ | R | L |
| plusW, Xor | $q_0$ | $q_0$ | $(q_L - B(right)) \cup (q_R - B(left))$ | R | L |

At a node of an expression tree represented by an operator, typically a region representation, such as a quadtree, is passed to each operand during the process of simplifying the expression tree. At the node comparing the operator, an action is to be taken as to whether a sub-tree branching off the node is to vainisih (i e , branches need to he pruned) or a quadtree corresponding to the unobscured portions of graphical elements is to be returned from this node for possible further processing at other nodes.

The following notation is used in Table 2:

| | |
|---|---|
| q0 | the quadtree passed to the node: |
| qL, qR | the quadtree returned by the left and right subtrees and corresponding to the left and right operand of an operator from Table 2; |
| $q_1 \cap q_2$, $q_1 \cup q_2$, $q_1 - q_2$ | quadtree set operations; and |
| B (node) | a quadtree completely containing the node's bounding box. |

In the last two columns of Table 2, typical replacement rules are specified, where "L" means replace a current node with the left sub-tree branching off the current node, "R" means replace a current node with the right sub-tree branching off the current node, and "V" means that the current node vanishes. A node that is to "vanish" implies that the region of the image represented by the node is obscured by other graphical elements. Hence, the node has no effect on the final image. If both operands vanish, the current node also vanishes.

Reverse operators can be substituted for the operators described in Table 2. The "over" operator, described as "A over B" implies graphical element "A" is over graphical element "B". For example, the can he substituted by a reverse operator of the "over" operator, typically denoted as "rover" (reverse over), so that "B rover A" results in a composite of graphical element "A" and "B" equivalent to "A over B".

Examples of Binary Compositing Operators

As an illustrative example, consider the (first) operator in the first row of the "Operator" column of Table 2 (i.e., the "over" operator). At a current node of an expression tree represented by an "over" operator, a parent node passes a quadtree $q_0$ to the current node. Following the action under the heading "Pass to left operand" (column 2 of Table 2), the quadtree $q_0$ is passed to the left operand, which is the left sub-tree or branch at the current node.

The quadtree $q_0$ is used to process the left operand, and a quadtree $q_L$ is returned as the obscuring area of the left operand. From "Pass to right operand" (column 3 of Table 2), the action to be take at the current node is to pass down, as the right operand a union of the parent node, quadtree $q_0$, and the now returned, left-operand quadtree $q_L$. The quadtree resulting from this union $(q_0 \cup q_L)$ is used to process the right operand. A quadtree $q_R$ is returned to the current node as the obscuring area of the right operand. The current node then returns the union $(q_L \cup q_R)$ of the left operand $q_L$ and the right operand $q_R$ to the parent node (see "return" in column 4 of Table 2).

If the region represented by the left operand is found to be completely obscured by the quadtree $q_0$ passed down to the left operand, the action "if left operand vanishes" of column 5 of Table 2 is to replace the current node with the right ("R") sub-tree, or right operand. This is desirable because changing the tree by replacing the current node with its right operand does not change the rendered image, but improves the time taken to render the image. Similarly, if the region represented by the right operand is found to be completely obscured by the quadtree $(q_0 \cup q_L)$ passed down to the right operand, the action "if right operand vanishes" of column 6 of Table 2 is to replace the current node with the left ("L") sub-tree.

Unary Operators

The treatment of unary operators when simplifying an expression tree depends on the type of operation:

(a) In colour transformation, the quadtree $q_0$ is passed down to the operand of the colour transformation operator. If the transformation preserves opaqueness (i.e. opaque pixels remain opaque after transformation), the quadtree returned from the operand is returned by the unary operator. In other words, the operand obscures that which the result of the colour transformation obscures. If the transformation does not preserve opaqueness, the unary operator returns an empty quadtree, because the region that the unary operation obscures cannot be determined. If the operand vanishes, the unary operator vanishes, unless invisibility (zero opacity) is not preserved. If invisibility is not preserved, the sub-tree having the unary operator as its root is replaced by an appropriate "all" graphical element.

(b) Affine transformations and image warps do not preserve geometry between the quadtree and the primitives. If the unary operator is obscured by quadtree $q_0$, it vanishes. Otherwise, traversal is restarted at the operand of the affine transformation or image warp operator, passing an empty quadtree as the obscuring region. An empty quadtree is returned by the operator unless the quadtree returned by its operand can be easily transformed.

(c) Image convolution: If the unary operator is obscured by quadtree $q_0$, it vanishes. Otherwise, traversal is restarted at the operand of the image convolution. passing an empty quadtree as the obscuring region. An empty quadtree is returned by such an operator because the blurring induced by the operator makes it difficult to use any quadtree returned by its operand. However, if the image convolution operator does not alter opacity, the quadtree returned by the operator's operand can be in turn returned by the operator of the image convolution to its parent node.

Optimising Expression Tree

In the preferred embodiment, an image composition expression tree (hereinafter "expression tree") of an image to be rendered is traversed, preferably in a depth-first fashion. Each node of the expression tree receives from its parent node a region representation of one or more areas of the image. The region representation is compared to the region represented at the node to determine if the region represented by that node is obscured.

A node in which the region represented by the node is totally obscured is removed from the expression tree with an appropriate simplification of tile expression tree, as hereinafter described. In the event that the region represented by the node is only partially obscured, a clipping operator is applied to the region represented by the node to clip the region of the image represented at the node to discard the obscured portions of the image. For example, if the region represented by a node is totally obscured by one or more regions represented by other nodes of the expression tree, the node is removed from the expression tree in such a way that a graphical operation or a graphical element at the node need not be executed or rendered, whichever the case may be.

If a node is partly obscured by one or more regions represented by other nodes in the expression tree, a clipping operator is applied to the node in such a way that, when executing a compositing operator, substantially unobscured regions of the image represented at the node are in the resultant composite of the region of the node. When an image is composited and subsequently rendered from an expression tree comprising nodes clipped by a clipping operator, substantially those portions of the graphical elements that are unobscured by other graphical elements of the image are reproduced or rendered.

Applying a clipping operator to a node can, in its simplest form, result in the cropping of the graphical elements represented at the descendent nodes to substantially those portions of the graphical elements that are unobscured. However, applying a clipping operator to a node is not limited thereto. Applying a clipping operator to a node of an expression tree having a compositing operation at that node can result in a different combination of compositing operators, having an effect on the node as if the region represented is cropped to its unobscured portion.

Figure 2A:
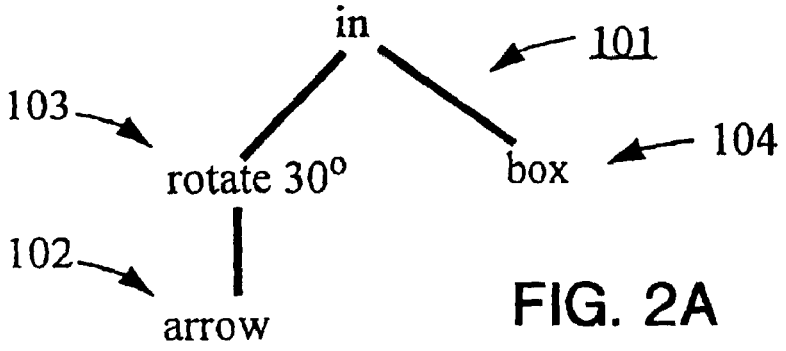
FIGS. 2A to 2D illustrate an example of applying a clipping operator in accordance with an embodiment of the present invention.
Figure 2B:
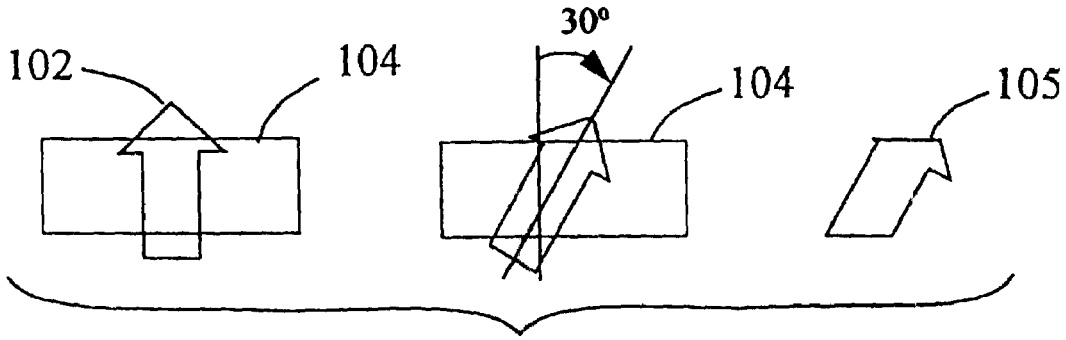

The process of compositing an expression tree 101 shown in FIG. 2A is now described with reference to FIGS. 2B to 2D. As depicted in FIG. 2B, an arrow 102 is rotated 30° in a clockwise direction, and the "in" operator is executed in conjunction with an opaque box 104 to result in a portion of the rotated arrow 105 that lies within the box 104. This can be achieved by applying a clipping operator to the arrow rotated 30° clockwise to crop the rotated arrow to the boundaries of tile box 104.

Figure 2C:
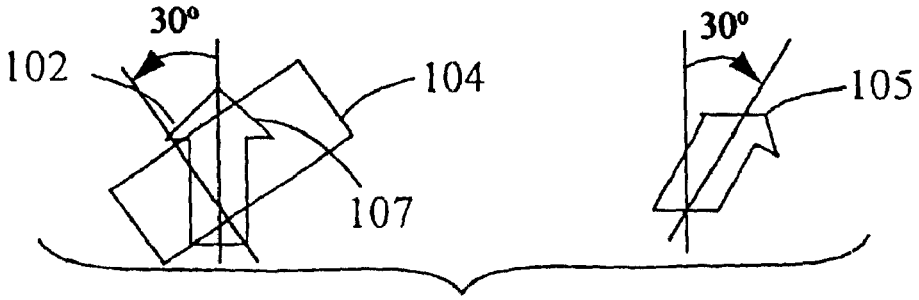
Figure 2D:
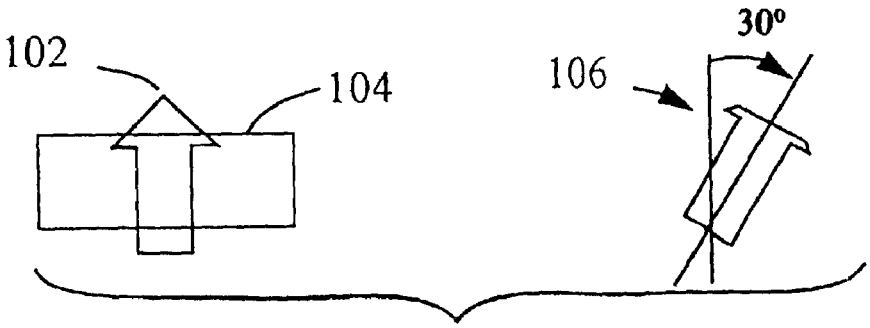

Alternatively, as shown in FIG. 2C, the application of a different combination of operators can result in substantially the same final image result 105. The box 104 is rotated counter-clockwise 30° , and the arrow 102 is clipped to the box 104. The resultant image 107 is rotated clockwise 30° to achieve a final image result 105. However, as shown in FIG. 2D, this is not the same as cropping the arrow 102 to the box 104, and then applying a clockwise rotation of 30°, to obtain a final composite image 106. In this manner, the application of a clipping operator to a node can result in a different combination of compositing operators.

If a region of the image represented by a node has been determined to be unobscured or only partially obscured, the node passes the region representation that the node received from a parent node, to each of its descendant nodes in turn. The same process occurs at each descendant node with the net effect that each descendant node passes back to its parent node either an image representation of tae areas of the image obscured by the region represented at the descendant node, or an indication that the descendant node is totally obscured.

After the descendants of a node have been processed, the region representations returned from the descendants are utilized to derive a region representation of the regions of the image that are obscured by the node. This result is returned to the node's parent.

In the preferred embodiment, the traversal of the expression tree to simplify the tree is initiated at the root of the tree in a "depth-first fashion", known to those skilled in the art. Preferably, when traversing an expression tree in a depth-first fashion, the path leading down the left branch, at any node, is given priority and this path down the tree to a descendent node is taken first. When no further left ranch paths are available at a current node, processing returns to the previous node and a path heading down a right branch of this node is taken. An expression tree is traversed in this manner until all nodes of the expression tree have been visited.

Flow Diagrams of Optimising An Expression Tree

Figure 9:
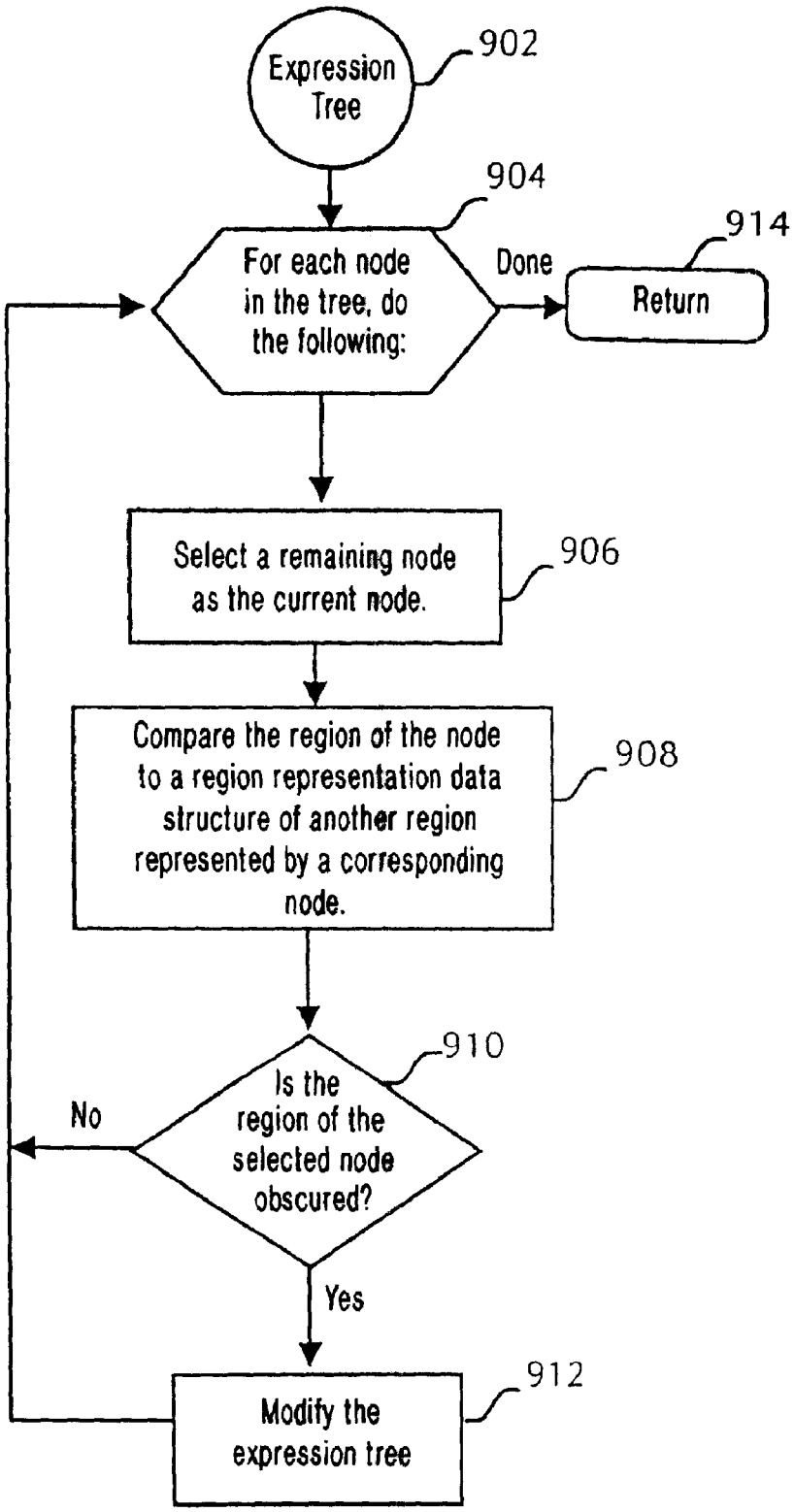
FIG. 9 is a high-level flow diagram providing an overview of the process of optimising an expression tree used to composite an image in accordance with the preferred embodiment.

FIG. 9 is a high-level flow diagram providing an overview of the process of optimising an expression tree 902 used to composite an image in accordance with the preferred embodiment. The expression tree 902 includes at least two nodes, and each node is either a graphical element or a graphical operator. Preferably, the graphical operators are image compositing operators. Further, a region of the image is represented by the node. The expression tree 902 can be traversed node by node. Control block 904 is preferably a for-loop control structure for processing each node of the expression tree 902, which is provided as input. When the entire expression tree 902 has been processed (indicated by "done"), processing stops at step 914. Otherwise processing continues at step 906.

In step 906, one of the remaining nodes is selected as the current node. In step 908, the region represented by the node is compared to a region representation data structure corresponding to one or more regions represented by at least one other node. The region representation is preferably of the form of a hierarchical data structure, and still further may be a quadtree representation. In decision block 910, a check is made to determine if the region represented by the node is obscured, either totally or partially, by one of the regions. If decision block 910 returns false (no), processing continues at control step 904. Otherwise, if decision block 910 returns true (yes), processing continues at step 912. In step 912, the expression tree is modified. The modification may include removing the current node or replacing the current node with another node of the expression tree. It may further include clipping, or marking for clipping at a later time, the region represented by the current node. Processing then continues at control step 904.

Figure 10:
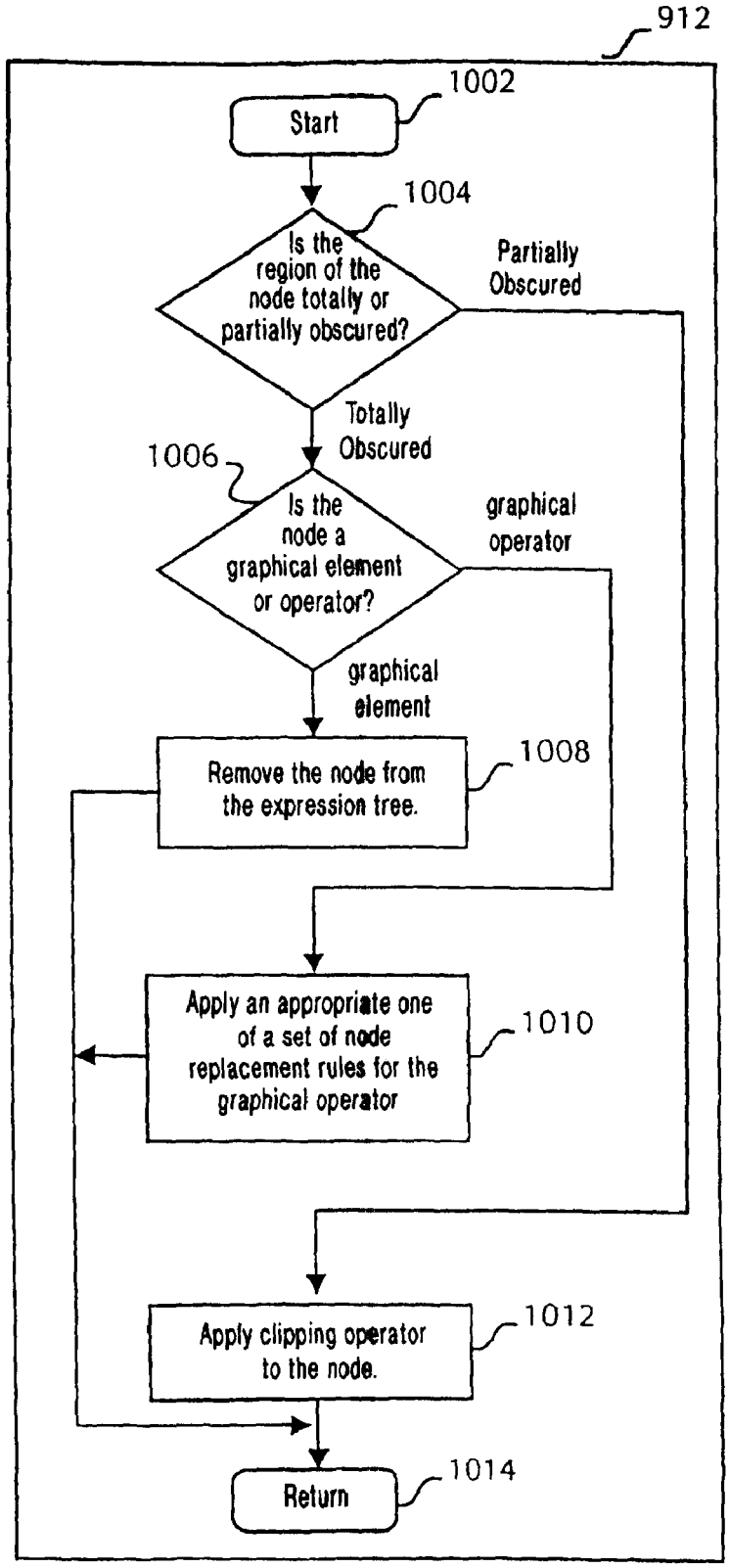
FIG. 10 is a detailed flow diagram illustrating modification of the expression tree in accordance with step 912 of FIG. 9.

FIG. 10 is a more detailed flow diagram illustrating steps for modifying the expression tree in accordance with step 912 of FIG. 9. Processing starts in step 1002, and in step 1004, a check is made to determine if the region represented by the current node is totally or partially obscured. If decision block 1004 determines that the region is partially obscured, processing continues at step 1012. In step 1012, a clipping operator is applied to the node and then the process returns at step 1014. Otherwise, if decision block 1004 determines that the region is totally obscured, processing continues at decision block 1006.

In decision block 1006, a check is made to determine if the current node is a graphical element or a graphical operator. If decision block 1006 determines that the node is a graphical element, processing continues at step 1008. In step 1008, the node is removed from the expression tree and processing returns to the calling procedure in step 1014. Otherwise, if decision block 1006 determines that the node is a graphical operator, processing continues at step 1010. In step 1010, a predetermined set of node replacement rules is applied in accordance with the graphical operator.

The predetermined set of node replacement rules (not shown in FIGS. 9 and 10) may include one or more of the following rules:

- if the parent node is an "over" graphical operator and the current node is at a left branch of the parent node, replace the parent node with a right subtree of the parent node;
- if the parent node is an "over" graphic operator and the current node is at a right branch of the parent node, replace the parent node with a left subtree of the parent node;
- if the parent node is an "in" graphical operator, remove the parent node and any subtree branching off the parent node;
- if the parent node is a "ratop" graphical operator and the current node is at a left branch of the parent node, removing the parent node and any subtree branching off the parent node;
- if the parent node is a "ratop" graphical operator and the current node is at a right branch of the parent node, replace the parent node with a left subtree of the parent node;
- if the parent node is an "out" graphical operator and the current node is at a left branch of the parent node, remove the parent node and any subtree branching off the parent node.
- if the parent node is an "out" graphical operator and the current node is at a right branch of the parent node, replace the parent node with a left subtree of the parent node;
- if the parent node is a "plusC" graphical operator and the current node is at a left branch of the parent node, replace the parent node with a right subtree of the parent node;
- if the parent node is an "plusC" graphical operator and the current node is at a right branch of the parent node, replace the parent node with a left subtree of the parent node;
- if the parent node is a "plusW" or an "Xor" graphical operator and the current node is at a left branch of the parent node, replace the parent node with a right subtree of the parent node; and
- if the parent node is an "plusW" or an "Xor" graphical operator and the current node is at a right branch of the parent node, replace the parent node with a left subtree of the parent node.

Figure 11:
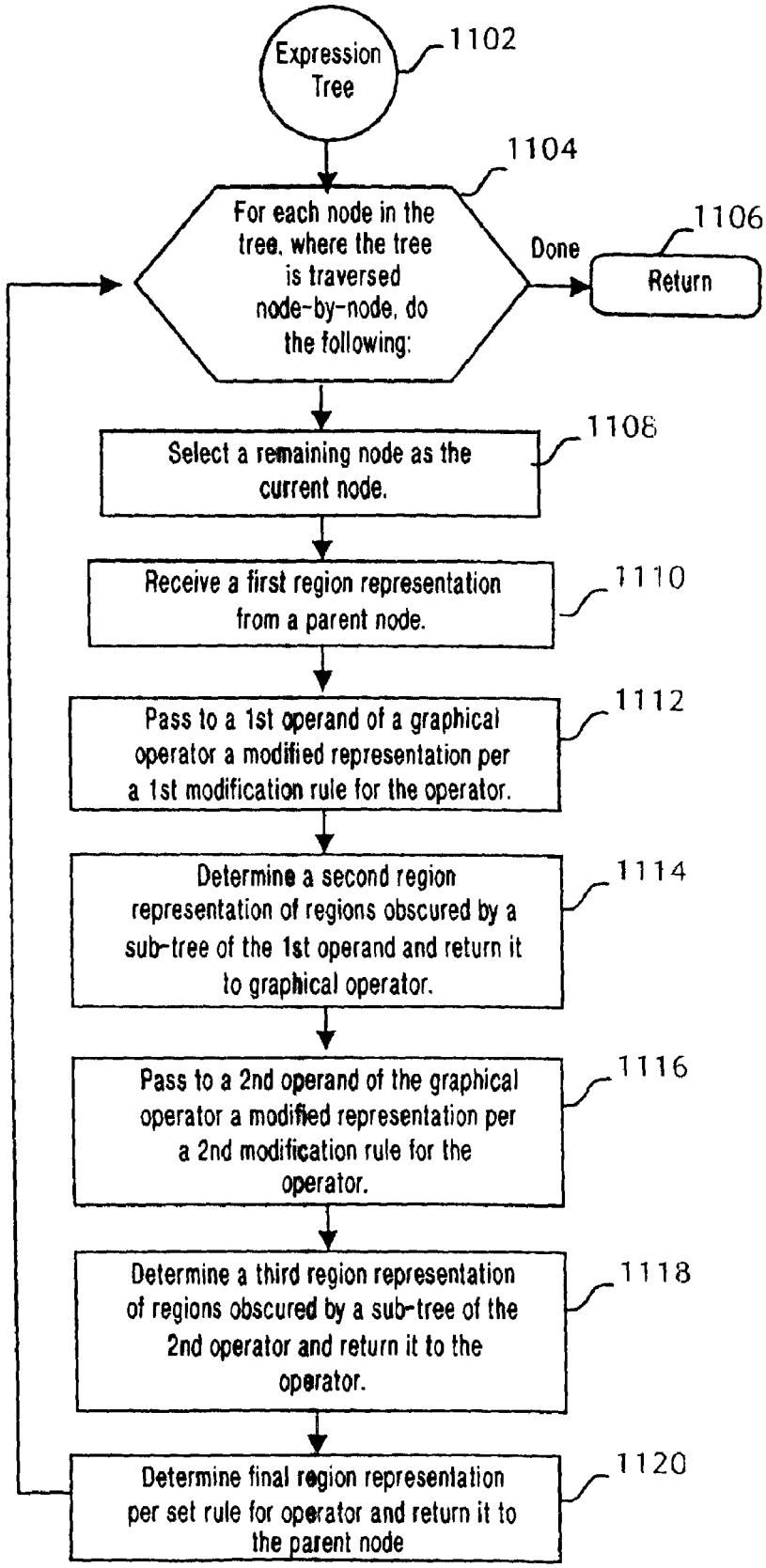
FIG. 11 is a further detailed flow diagram of optimising the expression tree.

FIG. 11 provides a detailed flow diagram of a process of optimising an expression tree 1102 according to another embodiment. The expression tree has a number of nodes, each of which can be either a graphical element or a graphical operator and represents a legion of the image. Control block 1104 is preferably a for-loop control structure for processing each node of the expression tree 1102, which is provided as input. The expression tree is traversed node by node. At each current node comprising a graphical operator, steps 1108 to 1120 are applied, as described hereinafter. When the entire expression tree 1102 leas been processed (indicated by "done"), preferably in a depth-first manner, processing stops at step 1106. Otherwise processing continues at step 1108.

In step 1108, one of the remaining nodes is selected as the current node. In step 1110, a first region representation is received from a parent node. In step 1112, a modified first region representation passes to a first operand of the graphical operator in accordance with a first predetermined modification rule for that operator. In step 1114, a second region representation of regions obscured by a sub-tree of the first operand is determined and it is returned to the graphical operator. In step 1116, a modified second region representation passes to a second operand of the graphical operator in accordance with a second predetermined modification rule for the operator.

In step 1118, a third region representation of regions obscured by a sub-tree associated with the second operand is returned to the graphical operator. In step 1120, a final region representation is determined in accordance with a set rule for the graphical operator and is returned to a parent node of the current node. Preferably, the set rule is selected from the group consisting of:

(A) where the graphic operator is an "over" or a "plusC" operator, the final region representation is determined from a union of the second region representation and the third region representation;

(B) where the graphic operator is an "in" operator, the final region representation is determined from an intersection of the second region representation and the third region representation;

(C) where the graphic operator is an "ratop" operator, the final region representation is the second region representation;

(D) where the graphic operator is an "out" operator, the final region representation is determined from a difference of the second region representation and a region representation comprising at least a region represented by a bounding box of a node at a right subtree of the current node; and (E) where the graphic operator is an "Xor" or a "plusW" operator, the final region representation is determined from a union of the second region representation less a region representation comprising at least a region represented by a bounding box of a node at a right subtree of the current node and the third region representation less a region representation containing a bounding box of a node at a right subtree of the current node.

The first predetermined modification rule preferably is to pass substantially tile first region representation as the modified first region representation if the graphical operator is an "over", "in", "ratop", "plusC", "plusW", "Xor", "out" (visit left operand first)" or a like operator. If the graphical operator is an "out (visit right operand first)" operation, it involves passing as the modified first region representation a union of the first region representation with the second region representation.

Further, the second predetermined modification rule is to pass substantially the first region representation as the modified second region representation if the graphical operator is an "in", "ratop", "out", "plusC", "plusW", "Xor" or like operators. If the graphical operator is an "over" operator, it involves passing as the modified second region representation a union of the first region representation with the second region representation.

Preferably, the image representation is not created at a node, or returned to a parent node of the node, unless the image representation is subsequently utilised, or if the node is the right operand of an "over" operator and the "over" operator node does not need to return an image representation to its parent node. Likewise, the image representation is not created at a node or returned if the node is the left or the right operand of an "in", "plusC", "plusW" or "Xor" operator and the operator node does not need to return an image representation to its parent node. Still further, the image representation may not be created at a node or returned to the parent node if the node is the left operand of an "out" or "ratop" operator and does not need to return an image representation to its parent node. The image representation may not be created at a node or returned if the node is the right operand of a "ratop" operator, the root of the expression tree, the operand of an image warp, affine transformation or convolution operator, the operand of a colour transformation that does not preserve opaqueness, or if the transformation node does not need to return an image representation to its parent node.

Further aspects of the preferred embodiment are set forth in detail in the Appendix forming part of the description. In particular, the Appendix contains pseudocode listings for implementing the method according to the preferred embodiment. In this connection, the preferred embodiment is preferably implemented as computer software, capable of being stored on recording media, that can be carried out as a process executing on a computing device, such as a general purpose computer.

Figure 12:
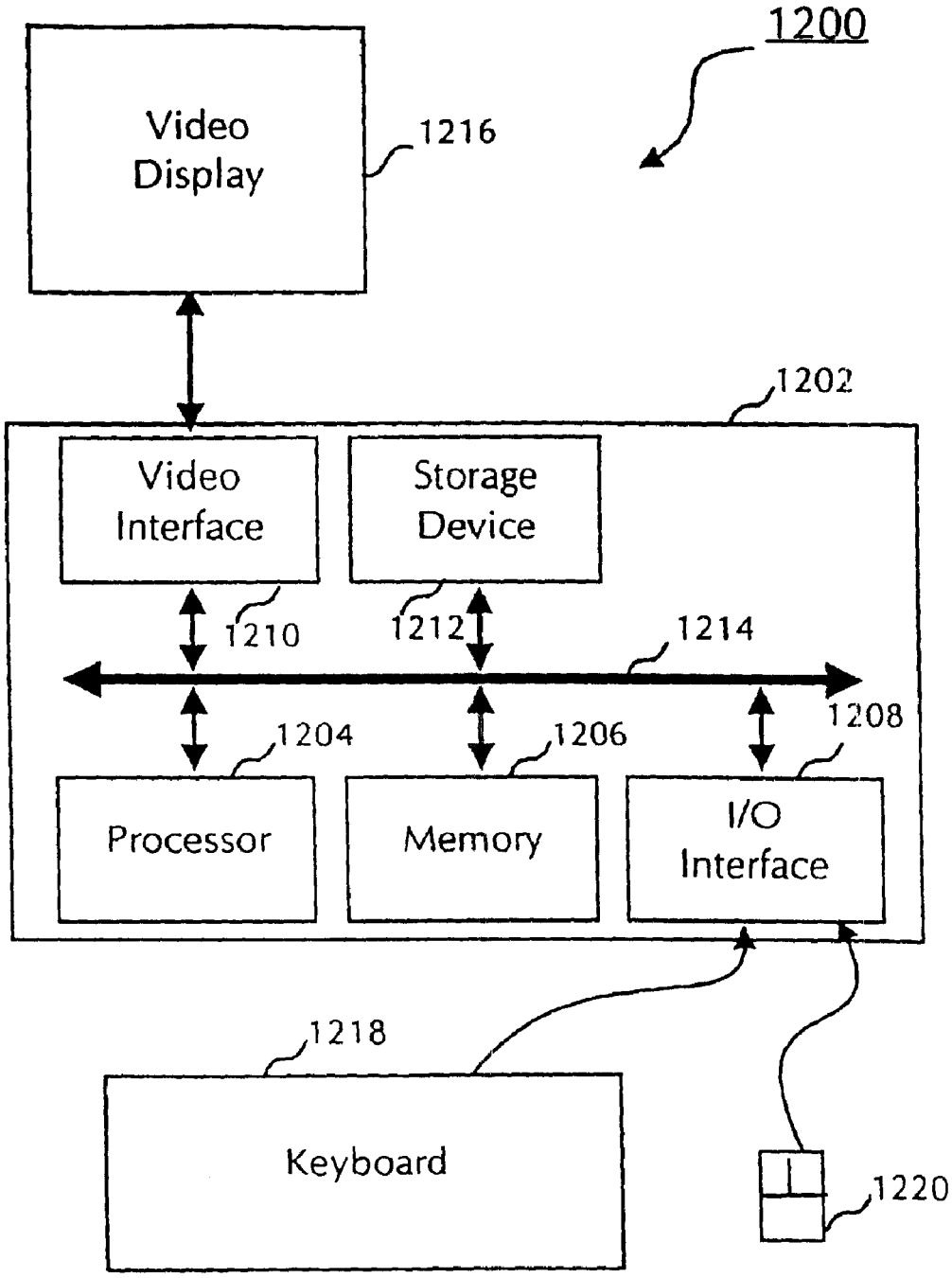
FIG. 12 is a block diagram of a conventional general-purpose computer that can he used to implement the embodiments of the invention.

The embodiments of the invention can preferably be practiced using a conventional general-purpose computer, such as the one shown in FIG. 12, for performing processes including those of FIGS. 9 to 11, as well as the pseudocode contained in the Appendix. In particular, the steps of the method of optimising the expression trees are effected by instructions in the software that are carried out by the computer. The computer system 1200 consists of the computer 1202, a video display 1216, and input devices 1218, 1220. In addition, the computer 1200 system can have any of a number of other output devices including line printers, laser printers, plotters, and other reproduction devices connected to the computer 1202. The computer system 1200 can be connected to one or more other computers using an appropriate communication channel such as a modem communications path, a computer network, or the like.

The computer 1202 itself consists of a central processing unit(s) (simply referred to as a processor hereinafter) 1204, a memory 1206 which can include random access memory (RAM) and read-only memory (ROM), an input/output (IO) interface 1208, a video interface 1210, and one or more storage devices generally represented by a block 1212 in FIG. 12. The storage device(s) 1212 can consist of one or more of the following: a floppy disc, a hard disc drive, a magneto-optical disc drive, CD-ROM or any other of a number of non-volatile storage devices well known to those skilled in the art. Each of the components 1204 to 1212 is typically connected to one or more of the other devices via a bus 1214 that in turn can consist of data, address, and control buses.

The video interface 1210 is connected to the video display 1216 aid provides video signals from the computer 1202 for display on the video display 1216. User input to operate the computer 1202 can be provided by one or more input devices. For example, a operator can use the keyboard 1218 and/or a pointing device such as the muse 1220 to provide input to the computer 1202. Exemplary computers on which the embodiment can be practiced include IBM-PC/ATs and compatibles, and Sun SparcStations.

FIRST EXAMPLE

Figure 3:
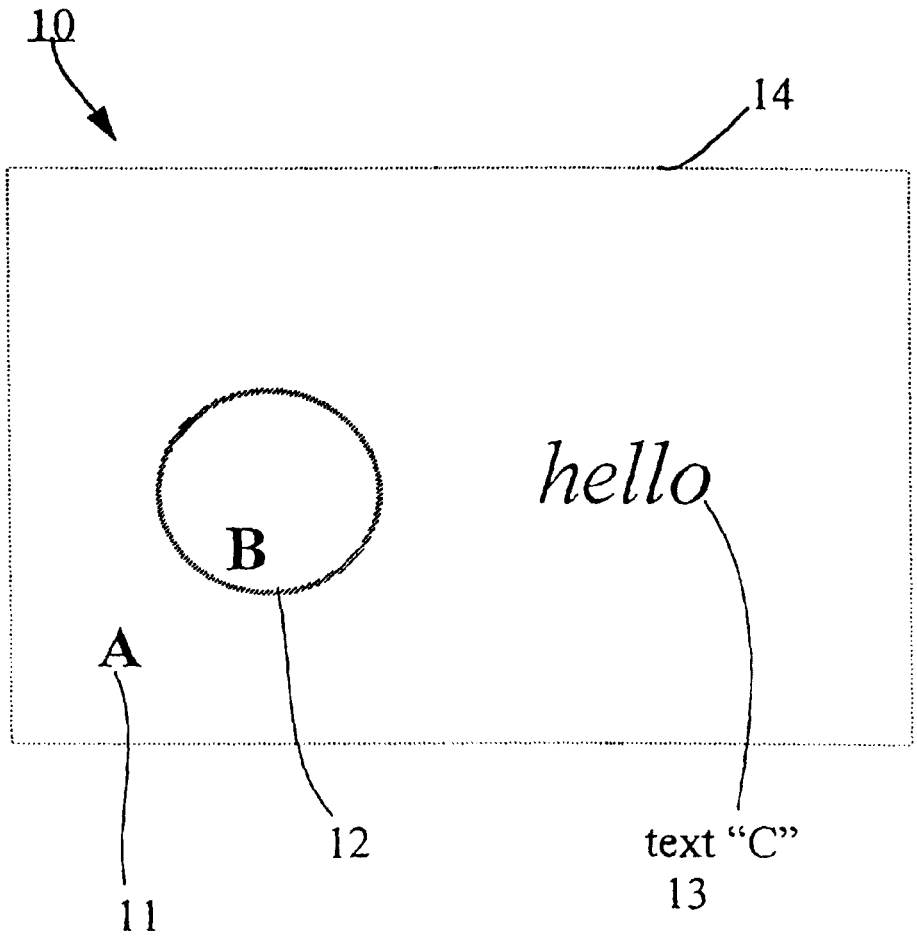
FIG. 3 illustrates an example of rendered image composed of simple graphical objects.

FIG. 3 illustrates an image 10 comprising a number of graphical elements. The graphical elements include an opaque image A referred to as sub-image 11, a circle 12 referred to as circle B that is obscured by the sub-image 11, and the text "hello" 13 optionally referred to as text "C". A dotted line 14 shows the extent of the image 10, and represents an empty foreground region having nothing therein to obscure the image 10.

Figure 4:
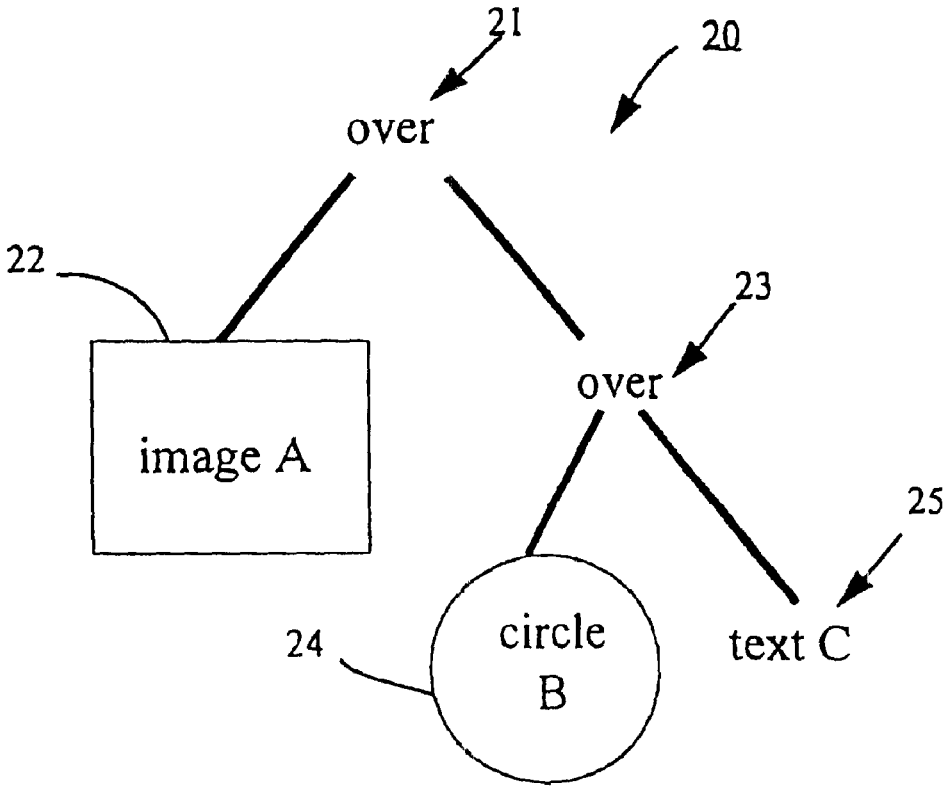
FIG. 4 illustrates an image expression tree which represents the composition of the simple graphical objects to compose or render the image of FIG. 3.

FIG. 4 shows an expression tree 20 that represents the composition of the image of FIG. 3. An example of simplifying the expression tree of FIG. 4 is now described. At a root (first node) 21 of the expression tree 20, a computer-implemented process passes to the first node 21 an empty quadtree representative of the empty region 14 not obscuring image 10 of FIG. 3 or equivalently having no other nodes above the first node 21 of the expression tree 20 to obscure it.

The first node 21 is a compositing operator (ie, an "over" operator) requiring a left and right operand. The left operand is a leaf node 22 representing the sub-image 11 of FIG. 3, and the right operand is returned by a second node 23 of the expression tree which is also an "over" compositing operator.

Following receipt of the empty quadtree at the first node 21, the process passes the empty quadtree to leaf node 22. At the leaf node 22, the quadtree is typically compared with the sub-image 11 to determine if the sub-image 11 is obscured. However, in this example, since the quadtree is an empty quadtree, no direct comparison is necessary to determine the result that the sub-image 11 is not (or cannot) be obscured by the empty quadtree.

Comparing a quadtree with a graphical element (eg, the sub-image 11) entails a comparison, in which regions of an image represented by the quadtree ate compared with regions of the image covered by the graphical element to determine whether one region obscures another region of the image. The comparison of a quadtree representation of a region of an image with other regions of the image includes comparing the region of the image with the other regions either by direct comparisons of their respective areas, or by comparing equivalent representations or the like.

Sub-image 11 represented at the leaf node 22 is opaque and therefore can potentially obscure other graphical objects of the image 10. A first quadtree representation of sub-image 11 is therefore constructed which includes the bounds of the sub-image 11 and is returned to the first node 21 since no further left or right branches are available at the leaf node 22 of the expression tree 10. At the first node 21, the "over" operator performs a union of the quadtree originally passed to that node, being an empty quadtree, and the quadtree representation is returned from the left node, in accordance with the rules set out in Table 2 for the treatment of binary compositing operators.

The union of an empty quadtree with the first quadtree representation of the sub-image 11 results in a quadtree equivalent (or substantially identical) to the first quadtree representative and referred to hereinafter as the first left quadtree.

The first left quadtree is forwarded to the second node 23 of the expression tree 10, and is passed following the same manner as described in relation to node 21 to the left branch of the second node to a leaf node 24 branching off the second node 23. The circle 12 is represented at the leaf node 24. Upon forwarding the first left quadtree to the leaf node 24, the process compares the first left quadtree (that is an image region represented by the first left quadtree) to the region of the image occupied by circle 12 to result, at least for this example, in a finding that the region of the circle 12 of FIG. 3 is totally obscured by the region represented by the first left quadtree. The finding that the region of the circle 12 is totally obscured is returned to the second node 23.

The second node 23 typically receives from the leaf node 24 a quadtree representative of the portion of image 10 obscured by sub-image 11 and the circle 12 (a region obtained by the union of the sub-image 11 and the circle). However, in the present example, since the circle 12 is totally obscured by the sub-image 11, a union of the quadtrees for sub-image 11 and the circle 12 does not need to be performed.

A quadtree substantially equivalent to the first left quadtree representing the sub-image 11 is returned to the second node 23, where this quadtree is passed to a right leaf node 25, branching off the second node 23. The right leaf node 25 of the expression tree represents a region of image comprising text ("hello") 13.

The text is not obscured by the quadtree (the image region represented by the quadtree) passed down from the second node 23. Typically, a quadtree representing the region of the image which is obscured by the graphical element at the right leaf node 25 is returned to the second node 23. However, since the text does not obscure a substantial region (area) in this case, an empty quadtree is returned to the second node 23. A substantial region is preferably defined by a performance issue of the process as hereinafter described.

The second node 23 receives the empty quadtree from the right leaf node 25. Following the action (shown in Table 2) of an "over" operator at the node when the left operand is obscured, the second node 23 replaces itself with the right leaf node 25 and prunes the left "branch", which in this example is the left leaf node 24. The quadtree (albeit the empty quadtree) returned to the second node 23 is passed back to the first node 21.

Figure 5:
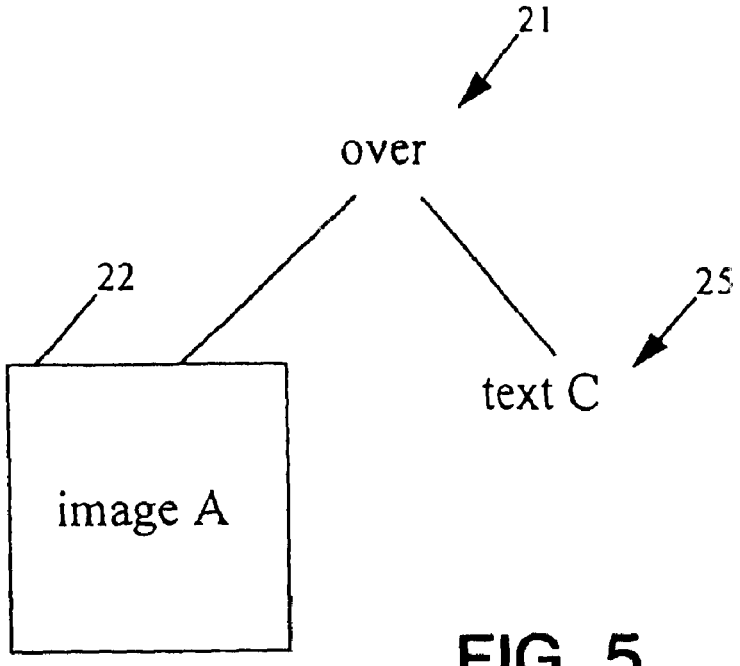
FIG. 5 shows a simplified image expression tree of the image expression tree of FIG. 4 in accordance to an embodiment of the present invention.

At the first node 21, neither of its descendants are pruned and the action of an "over" operator is to form a union of the quadtrees returned by it to the "over" operator left and right branches. Typically, the result of this union is passed back to the node's 21 parent node. However, this step can be optimised out of this example because the first node 21 is the top-most node of the expression tree (root node). Therefore, the result of the union is not utilised in the optimisation of the expression tree, and the simplified expression tree is illustrated in FIG. 5, where the second node 23 and the left leaf node 24 have been removed from the expression tree of FIG. 4. The simplified expression tree of FIG. 5 can then be used to render the image of FIG. 3 without the need to render the graphical element, the circle 12 as this graphical element is obscured by the sub-image 11.

SECOND EXAMPLE

Figure 6:
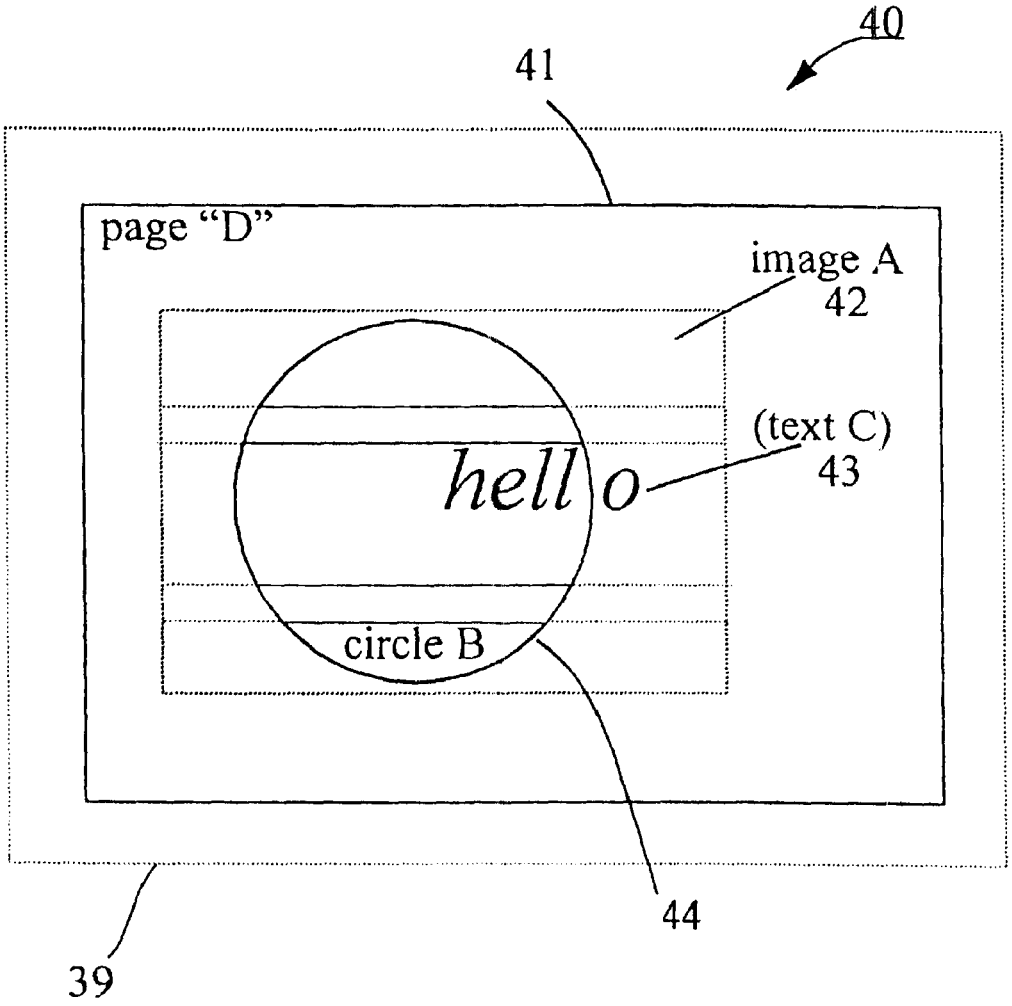
FIG. 6 illustrates another example of a rendered image composed of simple graphical objects.
Figure 7:
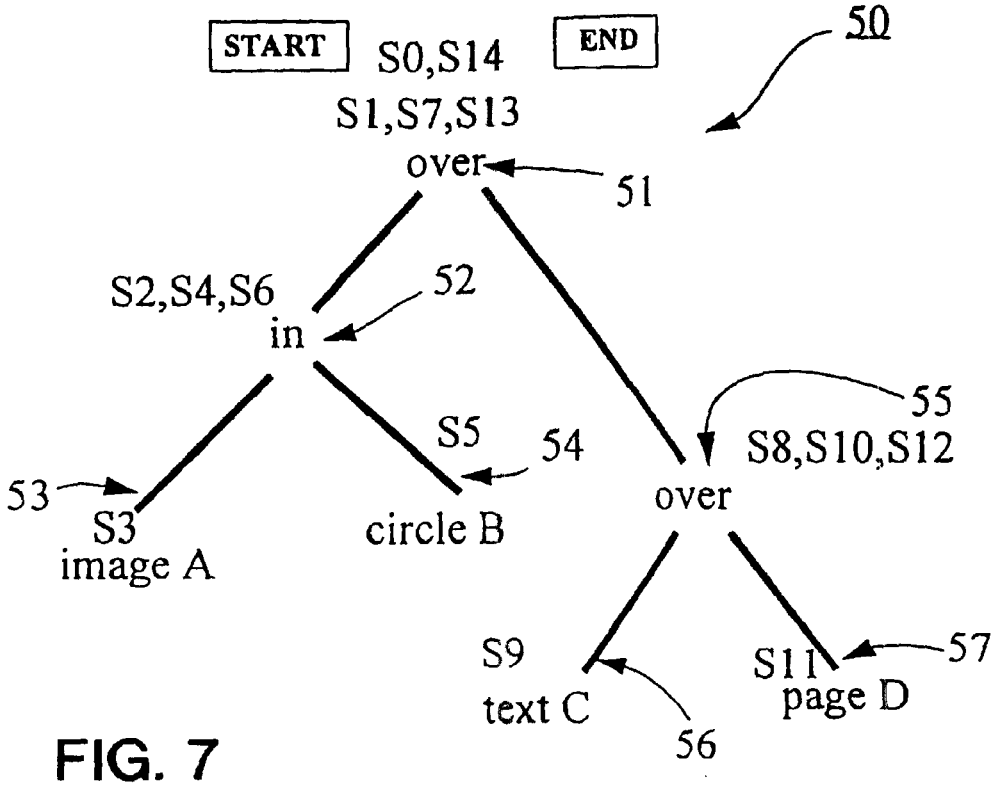
FIG. 7 shows an image expression tree which represents the composition of graphical objects to compose or render the image of FIG. 6.
Figure 8:
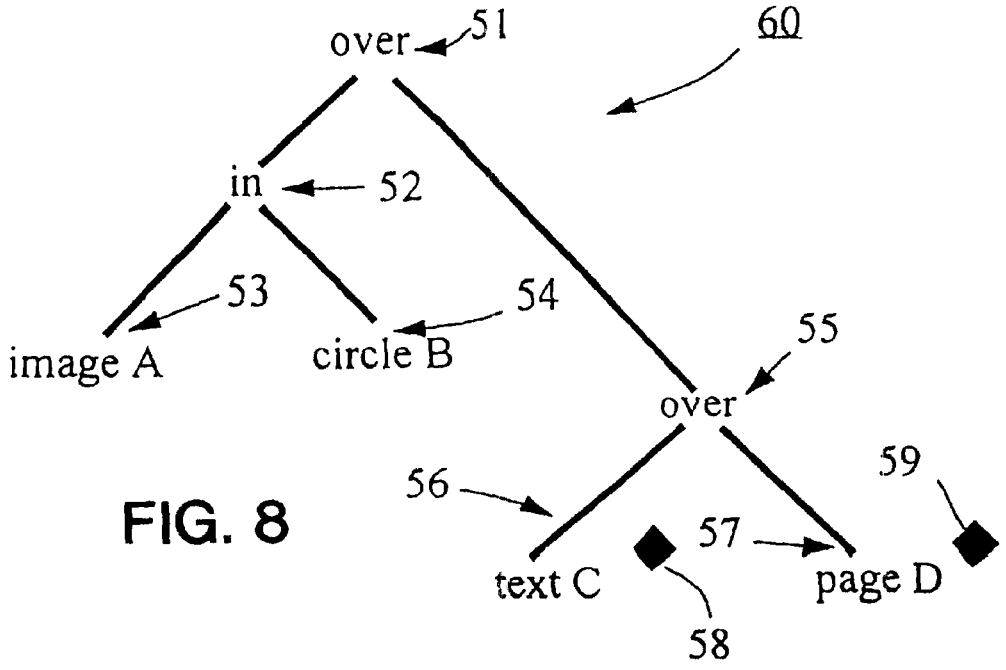
FIG. 8 illustrates a simplified expression tree for composing the image of FIG. 6 in accordance with the embodiment of the present invention.

Another example of simplifying (optimising) an expression tree is now described with reference to FIGS. 6 to 8. FIG. 6 illustrates an image 40 comprising several graphical elements, a page "D" 41, an opaque sub-image 42, text 43, and a circle 44. A corresponding expression tree for compositing or rendering the image 40 of FIG. 6 is illustrated in FIG. 7. In FIG. 7, S0 to S14 represents the steps taken in this example of the preferred embodiment to simplify or optimise the expression tree 50.

The following steps S0 to S14 correspond to the action taken by a computer implemented process at each node when simplifying the expression tree 50 of FIG. 7.

S0: An empty quadtree $q_0$ is created representing the empty foreground region 39 not obscuring the entire image 40. This empty quadtree $q_0$ is passed to a first node 51 (or root node) of the expression tree 50.

S1: The first node 51 of the expression tree 50 is an "over" operator. The process receives the empty quadtree $q_0$ passed to the first node 51 from the previous step S0 and compares the region of the image represented by the quadtree $q_0$ with a region represented by the first node 51 to determine if the region represented by the first node 51 is obscured. Since $q_0$ is an empty quadtree and cannot obscure the region represented by the first node 51, the process continues on to the descendant nodes. Firstly, the quadtree $q_0$ is passed down the left branch of the node 51 to a second node 52.

S2: The second node 52, being in this example an "in" operator, receives the empty quadtree $q_0$. The quadtree $q_0$ is compared with a region represented by the second node 52 to determine if this region is obscured by the quadtree $q_0$. The region of the second node 52 is not obscured by the quadtree $q_0$ since the quadtree $q_0$ is empty. The process continues in a depth-first fashion and passes the quadtree $q_0$ to the left branch of the second node 52.

S3: A third node 53 is a leaf node representing the sub-image 42. This third node 53 receives the quadtree $q_0$ passed down from the S2 step and compares the region of this node 53 with the region represented by the quadtree $q_0$ to determine if the region represented by node 53 is obscured by the quadtree $q_0$. In this example, the quadtree $q_0$ is empty and therefore the node 53 is not obscured. However, the image "A" is a graphical element that can potentially obscure other graphical elements. Hence, a quadtree $q_1$ that represents the region obscured by the image is created, and passed back to the second node 52 since no further left branches are available at the third node 53.

S4: The second node 52 receives back from the third node 53 the quadtree $q_1$ and as the second node 52 is an "in" operator, the quadtree $q_1$ is stored in memory as the obscuring region of the left operand of the "in" operator. The obscuring region of the left operand of an operator is denoted herein as $q_L$. Thus, in this example, $q_L=q_1$. The action of the process, in accordance with Table 2. is to pass down to a right descendant node 54 of the node 52 the quadtree received at the second node 52 passed down from its parent node 51. In this example, the quadtree $q_0$ passed to the second node 52 from the first node 51 (parent node) is sent down the right branch to the right descendent node 54.

S5: The right descendent node 54 (fifth node) is again a leaf node and has represented therein the region indicated as the circle 44. The quadtree $q_0$ has been passed down from the second node 52 following step S4, and is compared with the region of the image occupied by the circle 44 to determine if the region represented by the quadtree $q_0$ is obscured by the circle 44. Again, the quadtree $q_0$ is empty, and the node 54 is therefore not obscured. However, the circle 44 is a graphical element (object) with the potential to obscure graphical elements (objects) which may lie beneath. Hence, a quadtree $q_2$ is created representing the region of the image occupied by the circle. The quadtree $q_2$ is passed back to the second node 52 since no further branches are available at this node 54.

S6: The second node 52 receives the quadtree $q_2$ passed back from its right descendent node 54, and the quadtree $q_2$ is stored as the obscuring region of the right operand of the "in" operator (i.e., $q_R=q_2$). The process proceeds in accordance with the action set out in Table 2 for the "in" operator. It passes back to its parent node (ie, the first node 51) the intersection of the regions represented by its two operands (ie, the sub-image 42 with the region of the circle 44). The intersection results in the region represented by the portion of sub-image 42 that coincides with the circle 44 (ie, the quadtree $q_2$). In this example, this intersection $q_L \cap q_R = q_1 \cap q_2 = q_2$ represents the region in which node 52 can obscure other graphical elements.

S7: The first node 51 receives the quadtree $q_2$ passed back from the second node 52. The quadtree $q_2$ is stored as the obscuring region of the left operand of the "over" operator ($q_L=q_2$). In accordance with Table 2, the action to be performed when descending a right branch of a node having an "over" operator is to pass down the right branch a union (ie, $q_0 \cup q_L = q_0 \cap q_2 = q_2$) of the quadtree $q_0$ and the quadtree $q_L$ passed back from the second node 52. The result of this union ($q_0 \cup q_L$) is a quadtree substantially identical with $q_2$. Hence, the result of this union (the quadtree $q_2$) is passed down the right branch to a fifth node 55 also representing an "over" operator.

S8: The region represented by the quadtree $q_2$ passed to the fifth node 55 is compared with the region represented at the fifth node 55 to determine if the region of the node 55 is obscured by the quadtree $q_2$ (region of). The region of the image represented at the fifth node 55 is not obscured by the region of the quadtree $q_2$. The quadtree $q_2$ is passed down to the left branch descendent of the fifth node 55.

S9: The left descendent of the fifth node 55 is a leaf node 56 representing the region of the image of FIG. 6 illustrating the text 43. The leaf node 56 receives the quadtree $q_2$ passed down from the fifth node 55 and is compared to the region represented at the leaf node 56 (typically, the region of the image of FIG. 6 occupied by the text 43 is a bounding box comprising text) to determine if the region represented by quadtree $q_2$ obscures the region represented at leaf node 56. The region represented by the quadtree $q_2$ (the region occupied by circle 44) partly obscures text 43. Hence, the text 43 is clipped or tagged for clipping at a later stage. The text 43 is clipped by applying a clipping operator, wherein the clipping operation constructs a "clip" path from the quadtree $q_2$ and clips or cuts the text 43 to this path.

At this point, typically, a new quadtree representing the region of the image occupied by the text is created and returned to the fifth node 55. However in this embodiment, if a graphical element is too small to substantially obscure other graphical elements of the image (eg, the graphical element text "hello" 43 does not substantially obscure other graphical elements even though the bounding box of text 43 represents a substantial region), an empty quadtree is preferably returned rather than expend processing time to achieve a quadtree representation of the region of text 43. Hence, the creation of a new quadtree $q_3$ for regions of the image occupied by text 43 is chosen as an empty quadtree. The choice to create an empty quadtree for the region represented by text 43 is an issue of performance of the process that is hereinafter described under the sub-heading "Performance issues". While a quadtree representation for text 43 can be created, the cost in the performance speed of the process out-weighs the time it lakes to render text. Hence, the empty quadtree $q_3$ is created and passed back to the fifth node 55.

S10: The fifth node 55 receives the empty quadtree $q_3$ passed back by the previous step S9. This quadtree $q_3$ is stored as the obscuring region of the left operand of the "over" operator at the fifth node 55 ($q_L=q_3$). Again, in accordance with Table 2, the action to be performed when descending a right branch of a node having an "over" operator is to pass down to the right branch a union of the quadtree $q_2$ passed to the node 55 by the parent node 51 with the quadtree $q_3$ associated with the left operand ($q_L \cup q_2 = q_3 \cup q_2 = q_2$). The union of the quadtree $q_3$ with the quadtree $q_2$ results in a quadtree equivalent to quadtree $q_2$, since quadtree $q_3$ is the empty quadtree described in step S9. Therefore, quadtree $q_2$ is passed down the right branch of the expression tree to a right leaf node 57 of parent node (fifth node) 55.

S11: The right leaf node 57 is represented by the graphical element page "D" 41 representing the background page in FIG. 6. The quadtree $q_2$ passed down to the right leaf node 57 by the fifth node 55 is compared with the region of page "D" 41 to determine if the region represented by the quadtree $q_2$ obscures the region represented by page "D" 41. The result of this comparison is that the region represented by quadtree $q_2$ (circle 44) partly or in total obscures page "D" 41.

The graphical element page "D" is therefore either tagged so as to be clipped to the boundary of the circle 44 (a clip path derived from quadtree $q_2$) at some later stage of processing typically, before rendering, or a clipping operator is applied and the page "D" 41 is clipped so that the region described by the circle 44 is cut out of the page "D" 41. A quadtree can be created for representing the page "D" 41 so that it may be passed back to a parent node. However, in this example, the creation of such a quadtree is not needed since it can be deduced that no further graphical elements can be obscured.

S12: The process returns to the fifth node 55, where no further quadtrees need to be created.

S13: The process returns to the first node 51, where no further quadtrees need to be created.

S14: The process ends having optimised the expression tree 50 of FIG. 7 to provide the expression tree 60 of FIG. 8. The diamond shape symbols 58 and 59 shown in FIG. 8 indicate that the text 43 and the page "D" 41 are to be clipped (or have been clipped whichever the case may be), respectively.

Performance Issues

The foregoing examples of quadtree representations, described with reference to FIGS. 1 to 8, are created representing a region of an image occupied by a graphical element (object) irrespective of the relative size of the graphical element when compared with the entire image. However, the process performed in the embodiment is preferably governed by the following principles and corollaries:

(a) it is preferable to do the little that covers most cases than to attempt perfect results; and (b) at a node, at least initially, it is not known whether or riot obscuration actually occurs in an image, so it is preferable to avoid expensive tests having benefits that are uncertain. These principles apply in the following ways.

Firstly, increasing the depth (ie, the number of nodes and branches) of a quadtree increases the quadtree resolution and the ability to detect obscuration. However, beyond a predetermined resolution, the computational cost of creating and combining quadtrees increases exponentially, exceeding the savings in performance gained by attempting to eliminate from an expression tree the diminishing areas represented by the increased quadtree depth.

Secondly, it is computationally expensive to treat every opaque primitive as a potential obscurer (a graphical element likely to obscure other graphical element of an image). The smaller a primitive is the less likely it is to obscure another primitive. Hence, the creation of quadtrees is preferably limited to potential obscurers that are of a predetermined size or greater. Typically, primitives that are too costly to convert to a quadtree are not considered because they cannot guarantee a good return on the investment. Thus, a "good obscurer" preferably has the following features:

(a) fully opaque;

(b) larger than a predetermined size (and thus likely to obscure other primitives of an image);

(c) simple to convert to a quadtree very quickly (for example, choose only graphical objects comprising a single simple convex outline).

Thirdly, testing for obscuration (ie, determining whether a first graphical element obscures one or more graphical elements of an image) can be performed by representing the region covered by the first graphical element as a quadtree and testing if one or more cells of the region represented at the nodes of the quadtree obscure regions covered by the one or more graphical elements of the image. Typically, the one or more regions are also represented by quadtrees, and the cells of quadtrees are compared. However, representing an arbitrary region of an image as a quadtree representation, to a predetermined resolution, may prove very computationally expensive though entirely possible. Hence, a bounding box of a region represented at a node of an expression tree is preferably constructed. Whether the node is a graphical element or an operator, the region represented at the expression tree node is well defined.

While the bounding box at a node of an expression tree may not exactly represent the region covered by the node, the enhancement in computational performance typically outweighs the detriment in performance by failing to detect obscurities. Testing for obscured graphical elements by comparing their respective bounding box is preferred over comparing a quadtree representation of the regions of the image occupied by the graphical elements. This may result in some obscured graphical elements, below a predetermined size, being missed and considered not obscured. However, selecting a simple test for determining whether graphical elements are obscured by other graphical elements of the image is preferable over computationally expensive tests that in most common cases do not justify the return on the investment.

The following is an example of a pseudo-code call to a routine "test" which compares the bounding box at a node with a quadtree cell (hereinafter "cell").

```
function test (bounding_box, cell)
begin
  if cell is full then
    return true (representing obscuration)
  else if cell is empty then
    return false (representing non-obscuration)
  else begin
    cell is subdivided.
    if bounding_box and top right subcell have non-empty intersection then
      if not test (bounding_box, top right subcell) then
        return false
    if bounding_box and top left subcell have non-empty intersection then
      if not test (bounding_box, top left subcell) then
        return false
```

-continued

```
    if bounding_box and bottom right subcell have non-empty
          intersection then
      if not test (bounding_box, bottom right subcell) than
        return false
    if bounding_box and bottom left subcell have non-empty
          intersection then
      if not text (bounding_box, bottom left subcell) then
        return false
    return true
  end
end
```

This function (routine) is invoked with:

```
if bounding_box has non-empty intersection with rectangle represented by
  quadtree root then
    call test (bounding_box, quadtree root)
```

Quadtrees are created and discarded continuously. A very simple and fast scheme to manage computer memory is preferred with low memory allocation activity (eg, allocating largish blocks of memory, say, 1000 quadtree cells at a time). Cells are allocated to these blocks, treated as write-once-read-only, and not deallocated until the end of the entire expression tree traversal. This approach allows cells to be shared amongst quadtrees, and considerably reduces copying when performing quadtree set operations.

Preferably, as a performance issue, if a region representation (quadtrees) need not be created, no region representation is generated at a node. For example, a parent node may request from a descendent node a quadtree of the region which the descendent node and its descendent node may obscure. Typically, if a region representation is never to be utilized in subsequent computation, the region representation preferably does not need to be created.

The aforementioned process for optimising an expression tree is described using recursion for convenience. Implementation of the process is also possible using a non-recursive process utilising back-pointers. This is both to reduce function-call overhead, and to handle very large trees that in practise are rarely balanced.

The foregoing describes only a small number of embodiments of the present invention and modifications, obvious to those skilled in the art in view of the foregoing description, can be made thereto without departing from the scope and spirit of the present invention.

APPENDIX

The following function tests node for obscuration against quadtree $q_0$. It returns whether or not all visible parts of node are obscured. If need_result, then it also returns a quadtree representing what areas node obscures. It is invoked with the call:

```
obscure(root node of tree, false, empty quadtree)
```

```
function obscure(node, need_result, q0)
begin
      case node's type begin
  primitive →
    if q0 obscures the node's bounding box then
      return obscured.
```

-continued

```
    else if q0 partially obscures the node's bounding box and
        there is advantage in clipping the primitive (eg., it is an image,
        edge blend, box, all, or path primitive) then
    begin
      Clip if the overhead of clipping is worth the saving in not gen-
        erating and compositing the clipped pixels.
      Obtain a clip path from q0. This clip path remains associated with
        q0 while it exists, so that it is only ever created once.
    Tag the node as requiring clipping to this path.
  end
  if need_result then
  begin
    if the primitive is a good obscurer (a large opaque image, box or all:
        a large opaque path containing a single, simple, convex edge)
        then
    Construct a quadtree from the primitive's boundary.
        return this quadtree.
      else
        return empty quadtree.
    end
  colour transformation →
      if q0 obscures the node's bounding box then
      return obscured.
      else if q0 partially obscures the node's bounding box then
    begin
      Clip, as we expect the overhead of clipping to be worth the saving
        in not transforming the clipped pixels.
      Obtain a clip path from q0. This clip path remains associated with
        q0 while it exists, so that it is only ever created once.
      Tag the node as requiring clipping to this path.
    end
  Determine whether the transformation preserves opaqueness
    (opacity 1 maps to opacity 1), and whether it preserves invisbility
        (opacity 0 maps to opacity 0).
  call obscure(node's operand, transformation preserves opaqueness
      and need_result, q0), obtaining quadtree q1 if requested. If
      opaqueness is not preserved, then we can't know what areas will
      be obscured after the transformation is applied, so there is no
      point asking for a quadtree.
  if operand is obscured then
  begin
      Note that if the operand is said to be obscured, then it is only the
        visible parts (opacity # 0) that are guaranteed to be obscured.
    if transformation preserves invisibility then
        return obscured.
    else
    begin
      Determine what the transformation will transform invisible
       (opacity = 0) to.
      Replace this node by an "all" primitive of this colour/opacity.
      if need_result then
      return a quadtree constructed from the all's boundary.
    return
    end
  end
  if need_result then
  if transformation preserves opaqueness then
      return quadtree q1.
    else
      return empty quadtree.
affine transformation, image warp →
    if q0 obscures the node's bounding box then
        return obscured.
    else if qO partially obscures the node's bounding box then
    begin
    Clip, as we expect the overhead of clipping to be worth the saving
        in not generating and compositing the the clipped pixels.
    Obtain a clip path from q0. This clip path remains associated with
        q0 while it exists, so that it is only ever created once.
    Tag the node as requiring clipping to this path.
    end
    call obscure(node's operand, false, empty quadtree). We cannot
        pass q0 down the tree or accept a result unless we
        inverse/transform the quadtrees through the transformation.
image convolution →
  if q0 obscures the node's bounding box then
        return obscured.
  call obscure(node's operand, false, empty quadtree).
```

-continued

```
binary operator →
  if q0 obscures the node's bounding box then
        return obscured.
  case node's operator begin
over →
  call obscure(node's left operand, true, q0), obtaining area qL obscured
        by left operand.
  call obscure(node's right operand, need_result, if left operand
        is obscured then q0 else q0∪qL), obtaining area qR, obscured
        by right operand if need_result.
  if left operand is obscured and right operand is obscured then
      return obscured.
  else if left operand is obscured then
  begin
  Replace this node with its right operand.
  if need_result then
      return qR.
  end
  else if right operand is obscured then
  begin
    Replace this node with its left operand.
    if need_result then
    return qL.
  end
  else
  if need result then
    return qL∪qR.
  end
in →
  call obscure(node's left operand, need_result, q0), obtaining area qL
      obscured by left operand if need_result.
  if left operand is obscured then
    return obscured.
  call obscure(node's right operand, need_result, q0), obtaining area qR
      obscured by right operand if need_result.
  if right operand is obscured then
    return obscured.
  if need result then
    return qL∩qR.
out →
  call obscure(node's right operand. true, q0), obtaining area qR
      obscured by right operand.
  call obscure(node's left operand, need_result, if right operand is
      obscured then q0 else q0∪qR), obtaining area qL obscured by
      left operand if need_result.
  if left operand is obscured then
    return obscured.
    else if right operand is obscured then
    begin
    Replace this node with its left operand.
    if need_ result then
      return qL.
    end
    else
    if need_result then
      return qL-B(right operand).
  end
ratop →
  call obscure(node's left operand, need result, q0), obtaining area qL
      obscured by left operand if need_result.
  if left operand is obscured then
      return obscured.
  call obscure(node's right operand, false, q0).
  if right operand is obscured then
    Replace this node with its left operand.
  if need_result then
      return qL.
plusC →
  call obscure(node's left operand, need_result, q0), obtaining area qL
      obscured by left operand if need_result.
  call obscure(node's right operand, need result, q0), obtaining area qR
      obscured by right operand if need_result.
  if left operand is obscured and right operand is obscured then
      return obscured.
  else if left operand is obscured then
  begin
    Replace this node with its right operand.
    if need_result then
      return qR.
  end
```

-continued

```
    else if right operand is obscured then
    begin
        Replace this node with its left operand.
    if need_result then
        return q_L.
    end
    else
    if need_result then
        return q_L↑q_R.
    end
plusW, Xor →
    call obscure(node's left operand, need_result, q_0), obtaining area q_L
        obscured by left operand if need_result.
    call obscure(node's right operand, need_result, q_0), obtaining area q_R
        obscured by right operand if need_result.
    if left operand is obscured and right operand is obscured then
        return obscured.
    else if left operand is obscured then
    begin
      Replace this node with its right operand.
      if need_result then
        return q_R.
    end
    else if right operand is obscured then
    begin
      Replace this node with its left operand.
    if need_result then
        return q_L.
    end
    else
    begin
    if need_result then
        return (q_L-B(rightoperand)) ∪ (q_R-B(leftoperand)).
    end
    end case binary operator
    end case node type
end
```

What is claimed is:

1. A method of optimising an expression tree, said expression tree for compositing an image and comprising at least three nodes, each said node of said tree being at least either a graphical element or a graphical operator, the method comprising, for at least one node in said tree, the steps of:

comparing a first region of said node to a second region derived from at least one other node anywhere in said expression tree;

determining if said first region is totally or partially obscured by said second region; and modifying the expression tree if said first region is at least partially or totally obscured by said second region, to form an optimised expression tree in which an optimised part of said expression tree substantially represents unobscured portions of said first region,

*wherein said steps are performed by means of a programmed computer*.

2. The method as recited in claim 1, wherein the step of modifying the expression tree includes applying a clipping operator to said node in the event said first region is partially obscured.

3. The method as recited in claim 1, wherein the step of modifying the expression tree when said node is totally obscured further includes the steps of:

removing the node; and if the node has a parent node which has a graphical operator, selecting a node replacement rule from a predetermined set of node replacement rules in accordance with said graphical operator and applying said rule.

4. The method as recited in claim 3, wherein said predetermined set of node replacement rules comprises at least one step selected from the group consisting of:

if the parent node is an "over" graphical operator and the current node is at a left branch of the parent node, replacing the parent node with a right subtree of the parent node;

if the parent node is an "over" [graphic] *graphical* operator and the current node is at a right branch of the parent node, replacing the parent node with a left subtree of the parent node;

if the parent node is an "in" graphical operator, removing the parent node and any subtrees branching off the parent node;

if the parent node is a "ratop" graphical operator and the current node is at a left branch of the parent node, removing the parent node and any subtrees branching off the parent node;

if the parent node is a "ratop" graphical operator and the current node is at a right branch of the parent node, replacing the parent node with a left subtree of the parent node;

if the parent node is an "out" graphical operator and the current node is at a left branch of the parent node, removing the parent node and any subtrees branching off the parent node;

if the parent node is an "out" graphical operator and the current node is at a right branch of the parent node, replacing the parent node with a left subtree of the parent node;

if the parent node is a "plusC" graphical operator and the current node is at a left branch of the parent node, replacing the parent node with a right subtree of the parent node;

if the parent node is a "plusC" graphical operator and the current node is at a right branch of the parent node, replacing the parent node with a left subtree of the parent node;

if the parent node is a "plusW" or an "Xor" graphical operator and the current node is at a left branch of the parent node, replacing the parent node with a right subtree of the parent node; and if the parent node is an "plusW" or an "Xor" graphical operator and the current node is at a right branch of the parent node, replacing the parent node with a left subtree of the parent node.

5. The method as recited in any one of claims 1 to 4, wherein the graphical operators are image compositing operators.

6. The method as recited in claim 1, wherein said second region is represented by a region representation in the form of a hierarchical data structure.

7. The method as recited in claim 6, wherein the hierarchical data structure is a quadtree representation.

8. A method of optimising an expression tree for compositing an image, said expression tree comprising a plurality of nodes, each said node being at least either a graphical element or a graphical operator, said method comprising the steps of:

traversing the expression tree node by node; *and* determining at a current node if a first region of the image represented at said current node is obscured by a second region derived from at least one other node anywhere in said expression tree, and modifying said expression tree in the event that said first region of said current node is partially or totally obscured by said second region, to form an optimised expression tree in which an optimised part of said expression tree substantially represents unobscured portions of said first region,

*wherein said steps are performed by means of a programmed computer*.

9. The method as recited in claim ti, wherein said [moditiyinig] *modifying* includes removing said current rode or replacing said current node with another node of the expression tree.

10. The method as recited in claim [7] *8*, wherein said modifying further includes clipping, or marking for clipping at a later time, said first region represented by said current node.

11. A method of optimising an expression tree for compositing an image, said expression tree comprising a plurality of nodes, each said node comprising:

at least either a graphical element or a graphical operator and having a region of the image represented by said node, said method comprising the steps of:

traversing the expression tree node by node and at each current node comprising a graphical operator applying the sub-steps of:

(i) receiving a first region representation from a parent node;

(ii) passing to a first operand of said graphical operator a modified first region representation in accordance with a first predetermined modification rule for said operator;

(iii) returning to the graphical operator a second region representation of regions obscured by a sub-tree associated with the first operand;

(iv) passing to a second operand of said graphical operator a modified second region representation in accordance with a second predetermined modification rule for said operator;

(v) returning to the graphical operator a third region representation of regions obscured by a sub-tree associated with the second operand; and (vi) determining, in accordance will a set rule for said graphical operator, a final region representation to be returned to the parent node to form an optimised expression tree in which said final region representation substantially represents [an unobscured portion of the first region represented at the parent node] *a region within which said current node is capable of obscuring other nodes in said expression tree,*

*wherein said steps are performed by means of a programmed computer.*

12. The method as recited in claim 11, wherein said set rule is selected from the group consisting of:

(a) where the graphic operator is an "over" or a "plusC" operator, the final region representation to be returned to the parent node is determined from a union of the second region representation and the third region representation;

(b) where the graphic operator is an "in" operator, the final region representation to be returned to the parent node is determined from an intersection of the second region representation and the third region representation;

(c) where the graphic operator is a "ratop" operator, the final region representation to be returned to the parent node is the second region representation;

(d) where the graphic operator is an "out" operator, the final region representation to be returned to the parent node is determined from a difference of the second region representation and a region representation comprising at least a region represented by a bounding box of a node at a right subtree of the current node; and (e) where the graphic operator is an "Xor" or a "plusW" operator the final region representation to be returned to the parent node is determined from a union of the second region representation less a region representation comprising at least a region represented by a bounding box of a node at a right subtree of the current node and the third region representation less a region representation containing a bounding box of a node at a right subtree of the current node.

13. The method as recited in claim 11, wherein the first predetermined modification rule comprises:

passing substantially the first region representation as the modified first region representation in the event that the graphical operator is an "over", "in", "ratop", "plusC", "plusW", "Xor", *or* "out" (visit left operand first)" [or alike operators] *operator*; and if the graphical operator is an "out (visit right operand first)" operation, passing as the modified first region representation a union of the first region representation with the second region representation.

14. The method as recited in claim 11, wherein the second predetermined modification rule comprises:

passing substantially the first region representation as the modified second region representation in the event that the graphical operator is an "in", "ratop", "out", "plusC", "plusW", *or* "Xor" [or alike operators] *operator*; and in the event that the graphical operator is an "over" operator passing as the modified second region representation union of the first region representation with the second region representation.

15. The method as recited in any one of claims 11 to 14, wherein the image representation is not created at a node, or returned to a parent node of said node, unless said image representation is subsequently utilised.

16. The method as recited in claim 15, wherein the image representation is not created at a node or returned to the parent node if the node is selected from a group consisting of:

a right operand of an "over" operator and the "over" operator node does not need to return an image representation to its parent node;

a left operand of an "in", "plusC", "plusW" or "Xor" operator and said operator node does not need to return an image representation to its parent node;

a right operand of an "in", "plusC", "plusW" or "Xor" operator and said operator node does not need to return an image representation to its parent node;

a left operand of an "out" or "ratop" operator and said *operator node does not need to* return an image representation to its parent node;

a right operand of a "ratop" operator;

a root of the expression tree;

an operand of an image warp, affine transformation or convolution operator; *and* an operand of a colour transformation that does not preserve opaqueness or if said transformation node does not need to return an image representation to its parent node.

17. An apparatus for optimising an expression tree, said expression tree for compositing an image and comprising at least three nodes, each said node of said tree being at least either a graphical element or a graphical operator, the apparatus comprising:

means for[,] comparing a first region of said node to a second region derived from at least one other node anywhere in said expression tree;

means for determining if said first region is totally or partially obscured by said second region; and means for modifying the expression tree in the event that said first region is at least partially or totally obscured by said second region, to form an optimized expression tree in which an optimized part of said expression tree substantially represents unobscured portions of said first region.

18. The apparatus as recited in claim 17, wherein the modifying means includes means for applying a clipping operator to said node in the event said first region is partially obscured.

19. The apparatus as recited in claim 17, wherein the modifying means comprises:

means for removing the node; and means for selecting a node replacement rule from a predetermined set of node replacement rules in accordance with said graphical operator and applying said rule if the node has a parent node which has a graphical operator and the node is totally obscured.

20. The apparatus as recited in claim 19, wherein said predetermined set of node replacement rules comprises at least one step selected from the group consisting of:

if the parent node is an "over" graphical operator and the current node is at a left branch of the parent node, replacing the parent node with a right subtree of the parent node;

if the parent node is an "over" [graphic] *graphical* operator and the current node is at a right branch of the parent node, replacing the parent node with a left subtree of the parent node;

if the parent node is an "in" graphical operator, removing the parent node and any subtrees branching off the parent node;

if the parent node is a "ratop" graphical operator and the current node is at a left branch of the parent node, removing the parent node and any subtrees branching off the parent node;

if the parent node is a "ratop" graphical operator and the current node is at a right branch of the parent node, replacing the parent node with a left subtree of the parent node;

if the parent node is an "out" graphical operator and the current node is at a left branch of the parent node, removing the parent node and any subtrees branching off the parent node;

if the parent node is an "out" graphical operator and the current node is at a right branch of the parent node, replacing the parent node with a left subtree of the parent node;

if the parent node is a "plusC" graphical operator and the current node is at a left branch of the parent node, replacing the parent node with a right subtree of the parent node;

if the parent node is a "plusC" graphical operator and the current node is at a right branch of the parent node, replacing the parent node with a left subtree of the parent node;

if the parent node is a "plusW" or an "Xor" graphical operator and the current node is at a left branch of the parent node, replacing the parent node with a right subtree of the parent node; and if the parent node is a "plusW" or an "Xor" graphical operator and the current node is at a right branch of the parent node, replacing the parent node with a left subtree of the parent node.

21. The apparatus as recited in any one of claims 17 to 20, wherein the graphical operators are image compositing operators.

22. The apparatus as recited in claim 17, wherein said second region is represented by a region representation in the form of a hierarchical [to] data structure.

23. The apparatus as recited in claim 22, wherein the hierarchical data structure is a quadtree representation.

24. An apparatus for optimizing an expression tree for compositing an image, said expression tree comprising a plurality of nodes, each said node being at least either a graphical element or a graphical operator, said apparatus comprising:

means for traversing the expression tree node by node;

means for determining at a current node if a first region of the image represented at said current node is obscured by a second region derived from at least one other node anywhere in said expression tree; and means for modifying said expression tree in the event that said first region of said current node is partially or totally obscured by said second region to form an optimized expression tree in which an optimized part of said expression tree substantially represents [unobsured] *unobscured* portions of said first region.

25. The apparatus as recited in claim 24, wherein said modifying means includes means for removing said current node or replacing said current node with another node of the expression tree.

26. The apparatus as recited in claim 24, wherein said modifying means further includes means for clipping, or marking for clipping at a later time, the region represented by said current node.

27. An apparatus for optimizing an expression tree for compositing an image, said expression tree comprising a plurality of nodes, each said node comprising at least either a graphical element or a graphical operator and having a region of the image represented by said node, said apparatus comprising:

means for traversing the expression tree node by node, said traversing means for each current node comprising a graphical operator, further comprising:

means for receiving a first region representation from a parent node;

means for passing to a first operand of said graphical operator a modified first region representation in accordance with a first predetermined modification rule for said operator;

means for returning to the graphical operator a second region representation of regions obscured by a sub-tree associated with the first operand;

means for passing to a second operand of said graphical operator a modified second region representation in accordance with a second predetermined modification rule for said operator;

means for returning to the graphical operator a third region representation of regions obscured by a sub-tree associated with the second operand; and means for determining, in accordance with a set rule for said graphical operator, a final region representation to be returned to the parent to form an optimized expression tree in which said final region representation substantially represents [an unobscured portion of said first region represented at the parent node] *a region within which said current node is capable of obscuring other nodes in said expression tree*.

28. The apparatus as recited in claim 27, wherein said set rule is selected from the group consisting of:

(a) where the graphic operator is an "over" or a "plusC" operator, the final region representation to be returned to the parent node is determined from a union of the second region representation and the third region representation;

(b) where the graphic operator is an "in" operator, the final region representation to be returned to the parent node is determined from an intersection of the second region representation and the third region representation;

(c) where the graphic operator is [an] *a* "ratop" operator, the final region representation to be returned to the parent node is the second region representation;

(d) where the graphic operator is an "out" operator, the final region representation to be returned to the parent node is determined from a difference of the second region representation and a region representation comprising at least a region represented by a bounding box of a node at a right subtree of the current node; and (e) where the graphic operator is an "Xor" or a "plusW" operator the final region representation to be returned to the parent node is determined from a union of the second region representation less a region representation comprising at least a region represented by a bounding box of a node at a right subtree of the current node and the third region representation less a region representation containing a bounding box of a node at a right subtree of the current node.

29. The apparatus as recited in claim 27, wherein the first predetermined modification rule comprises:

passing substantially the first region representation as the modified first region representation in the event that the graphical operator is an "over", "in", "ratop", "plusC", "plusW", "Xor", *or* "out" (visit left operand first)" [or alike operators] *operator*; and if the graphical operator is an "out (visit right operand first)" operation, passing as the modified first region representation a union of the first region representation with the second region representation.

30. The apparatus as recited in claim 27, wherein the second predetermined modification rule comprises:

passing substantially the first region representation as the modified second region representation in the event that the graphical operator is an "in", "ratop", "out", "plusC", "plusW", *or* "Xor" [or alike operators] *operator*; and in the event that the graphical operator is an "over" operator, passing as the modified second region representation *a* union of the first region representation with the second region representation.

31. The apparatus as recited in any one of claims 27 to 30, wherein the image representation is not created at a node, or returned to a parent node of said node, unless said image representation is subsequently utilised.

32. The apparatus as recited in claim 31, wherein the image representation is not created at a node or returned to the parent node if the node is selected from a group consisting of:

a right operand of an "over" operator and the "over" operator node does not need to return an image representation to its parent node;

a left operand of an "in", "plusC", "plusW" or "Xor" operator and said operator node does nor need to return an image representation to its parent node;

a right operand of an "in", "plusC", "plusW" or "Xor" operator and said operator node docs not need to return an image representation to its parent node;

a left operand of an "out" or "ratop" operator and said *operator node does not need to* return an image representation to its parent node;

a right operand of a "ratop" operator;

a root of the expression tree;

an operand of an image warp, affine transformation or convolution operator; *and* an operand of a colour transformation that does not preserve opaqueness or if said transformation node does not need to return an imap representation to its parent node.

* * * * *

UNITED STATES PATENT AND TRADEMARK OFFICE

CERTIFICATE OF CORRECTION

PATENT NO. : RE42,847 E
APPLICATION NO. : 10/368583
DATED : October 18, 2011
INVENTOR(S) : Politis It is certified that error appears in the above-identified patent and that said Letters Patent is hereby corrected as shown below:

On the Title Page:

Item [64], Replace sub-heading, PCT Filed: with sub-heading, Filed.

Signed and Sealed this
First Day of November, 2011

David J. Kappos

David J. Kappos
*Director of the United States Patent and Trademark Office*